US011028276B2

(12) United States Patent
Kawamura et al.

(10) Patent No.: US 11,028,276 B2
(45) Date of Patent: Jun. 8, 2021

(54) SURFACE-TREATED METAL SHEET, COATED MEMBER, AND METHOD FOR PRODUCING COATED MEMBER

(71) Applicant: NIPPON STEEL & SUMITOMO METAL CORPORATION, Tokyo (JP)

(72) Inventors: Yasuaki Kawamura, Tokyo (JP); Koji Akioka, Tokyo (JP); Akihiro Sengoku, Tokyo (JP); Yoichiro Mori, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 172 days.

(21) Appl. No.: 15/560,847

(22) PCT Filed: Mar. 30, 2016

(86) PCT No.: PCT/JP2016/060488
§ 371 (c)(1),
(2) Date: Sep. 22, 2017

(87) PCT Pub. No.: WO2016/159138
PCT Pub. Date: Oct. 6, 2016

(65) Prior Publication Data
US 2018/0112084 A1    Apr. 26, 2018

(30) Foreign Application Priority Data

Mar. 31, 2015  (JP) ............................. JP2015-074525
Oct. 2, 2015   (JP) ............................. JP2015-197164

(51) Int. Cl.
*C09D 5/24*     (2006.01)
*C09D 7/61*     (2018.01)
(Continued)

(52) U.S. Cl.
CPC .............. *C09D 5/24* (2013.01); *B05D 7/14* (2013.01); *B32B 15/08* (2013.01); *C09D 5/02* (2013.01);
(Continued)

(58) Field of Classification Search
CPC ........ C09D 5/08; C09D 5/5082; C09D 5/084; C09D 5/086; C09D 5/088; C09D 5/10;
(Continued)

(56) References Cited

U.S. PATENT DOCUMENTS 4,079,163 A * 3/1978 Tanaka ................. B23K 35/226
                                                228/203
4,391,855 A * 7/1983 Geeck .................. C09D 163/00
                                                427/383.7
(Continued)

FOREIGN PATENT DOCUMENTS

CN      1668460 A      9/2005
CN      101517015 A    8/2009
(Continued)

OTHER PUBLICATIONS

Machine translation by Google Patents of JP10-043677A, published Feb. 1998. (Year: 1998).*
(Continued)

*Primary Examiner* — Monique R Jackson
(74) *Attorney, Agent, or Firm* — Birch, Stewart, Kolasch & Birch, LLP

(57) ABSTRACT

Provided are a surface-treated metal sheet excellent in the adhesiveness to a coating treatment film and weldability and a coated member. The surface-treated metal sheet includes a metal sheet and a coating film placed on at least one major surface of the metal sheet; the coating film contains oxide particles, a binder resin, and electrically conductive particles; the amount of electrically conductive particles con-
(Continued)

tained is 5 to 30 mass % relative to the coating film; the oxide particles include non-doped oxide particles and/or doped oxide particles; the non-doped oxide particles include at least one kind selected from the group consisting of zinc oxide particles, tin oxide particles, magnesium oxide particles, calcium oxide particles, and strontium oxide particles; the doped oxide particles include at least one kind selected from the group consisting of doped zinc oxide particles and doped tin oxide particles; the amount of oxide particles contained is 1 to 30 mass %, but is 1 to 10 mass % relative to the coating film in the case of not including doped oxide particles; and the amount of the coating film attached to the major surface is 2 to 20 g/m$^2$.

10 Claims, 2 Drawing Sheets

(51) Int. Cl.

| | | |
|---|---|---|
| *B05D 7/14* | (2006.01) | |
| *C09D 5/08* | (2006.01) | |
| *C08K 3/08* | (2006.01) | |
| *C08K 3/22* | (2006.01) | |
| *C08K 3/36* | (2006.01) | |
| *C08K 3/32* | (2006.01) | |
| *C09D 167/00* | (2006.01) | |
| *C09D 175/04* | (2006.01) | |
| *C09D 201/00* | (2006.01) | |
| *C09D 5/10* | (2006.01) | |
| *C09D 5/02* | (2006.01) | |
| *C09D 7/40* | (2018.01) | |
| *C23C 28/00* | (2006.01) | |
| *B32B 15/08* | (2006.01) | |
| *C08K 3/14* | (2006.01) | |
| *C08K 3/28* | (2006.01) | |
| *C08K 3/34* | (2006.01) | |

(52) U.S. Cl.
CPC ................. *C09D 5/08* (2013.01); *C09D 5/10* (2013.01); *C09D 7/40* (2018.01); *C09D 7/61* (2018.01); *C09D 167/00* (2013.01); *C09D 175/04* (2013.01); *C09D 201/00* (2013.01); *C23C 28/00* (2013.01); *C08K 3/08* (2013.01); *C08K 3/14* (2013.01); *C08K 3/22* (2013.01); *C08K 3/28* (2013.01); *C08K 3/32* (2013.01); *C08K 3/34* (2013.01); *C08K 3/36* (2013.01); *C08K 2003/0856* (2013.01); *C08K 2003/222* (2013.01); *C08K 2003/2206* (2013.01); *C08K 2003/2296* (2013.01); *C08K 2003/327* (2013.01); *C08K 2201/001* (2013.01); *C08K 2201/014* (2013.01)

(58) Field of Classification Search
CPC . C09D 5/24; C09D 5/002; C09D 5/12; C08K 2003/2206; C08K 2003/2296; C08K 2003/2231; C08K 2003/222; C08K 2003/0856; C08K 3/11; C08K 2003/2217
See application file for complete search history.

(56) References Cited

U.S. PATENT DOCUMENTS

| | | | |
|---|---|---|---|
| 2005/0161641 A1* | 7/2005 | Gros | .................... B23K 35/226 252/500 |
| 2006/0058423 A1* | 3/2006 | Gros | ........................ C09D 5/10 523/173 |
| 2013/0161062 A1* | 6/2013 | Yamaoka | ................ C09D 5/084 174/110 SR |
| 2014/0147645 A1* | 5/2014 | Jung | ........................ C09D 5/24 428/216 |
| 2018/0112084 A1 | 4/2018 | Kawamura et al. | |

FOREIGN PATENT DOCUMENTS

| | | | |
|---|---|---|---|
| CN | 103649243 A | | 3/2014 |
| CN | 102993847 B | | 2/2015 |
| JP | 51-117935 A | | 10/1976 |
| JP | 55-17508 A | | 2/1980 |
| JP | 55-54366 A | | 4/1980 |
| JP | 57-143489 A | | 9/1982 |
| JP | 58-96822 A | | 6/1983 |
| JP | 7-224389 A | | 8/1995 |
| JP | 9-276788 A | | 10/1997 |
| JP | 10043677 A | * | 2/1998 |
| JP | 2000-70842 A | | 3/2000 |
| JP | 2002-206173 A | | 7/2002 |
| JP | 2002-206174 A | | 7/2002 |
| JP | 2003-513141 A | | 4/2003 |
| JP | 2003-268567 A | | 9/2003 |
| JP | 2003-286556 A | | 10/2003 |
| JP | 2004-42622 A | | 2/2004 |
| JP | 2005-288730 A | | 10/2005 |
| JP | 2005-325427 A | | 11/2005 |
| KR | 10-2017-0127485 A | | 11/2017 |
| TW | 201412904 A | | 4/2014 |
| WO | WO 2015/026602 A1 | | 2/2015 |

OTHER PUBLICATIONS

International Search Report for PCT/JP2016/060488 dated May 31, 2016.
Office Action for TW 105110288 dated Nov. 25, 2016.
Written Opinion of the International Searching Authority for PCT/JP2016/060488 (PCT/ISA/237) dated May 31, 2016.
Korean Office Action for corresponding Korean Application No. 10-2017-7027430, dated Feb. 19, 2019, with English translation.
Japanese Office Action, dated Jul. 31, 2018, for corresponding Japanese Application No. 2017-510137, with an English translation.
Extended European Search Report dated Dec. 6, 2018, for corresponding European Application No. 16773019.1.
Chinese Office Action and Search Report dated Nov. 30, 2018, for corresponding Chinese Application No. 201680017843.X, with partial English translation.
Korean Notice of Allowance for Korean Application No. 10-2017-7027430, dated Aug. 29, 2019, with a machine translation.

* cited by examiner

SURFACE-TREATED METAL SHEET, COATED MEMBER, AND METHOD FOR PRODUCING COATED MEMBER

TECHNICAL FIELD

The present invention relates to a surface-treated metal sheet, a coated member, and a method for producing a coated member.

BACKGROUND ART

Most automobile body members are formed of, for example, metal sheets such as steel sheets; and are produced by, for example, undergoing many processes such as (1) a blanking process that cuts a metal sheet to a prescribed size, (2) an oil cleaning process that cleans the blanked metal sheet with oil, (3) a process that press-molds the blanked metal sheet, (4) a joining process that fashions the molded material into a member with a desired shape by spot welding, adhesion, or the like, (5) a process that removes the press oil of the surface of the joined member for cleaning, (6) a chemical conversion treatment process, and (7) an electrodeposition coating process. An automobile body member used as an outer sheet generally further undergoes, for example, coating processes such as (8) an intermediate coating process and (9) an over-coating process. Thus, in the automotive industry, there is a high demand for cost reduction by omitting and simplifying production processes, in particular the chemical conversion treatment process and the coating process.

The corrosion resistance of an automobile body member is usually ensured by a chemical conversion treatment covering film formed by a chemical conversion treatment process and an electrodeposition coating film formed by a subsequent electrodeposition coating process. However, a portion where neither the chemical conversion treatment covering film nor the electrodeposition coating treatment film goes around may be present in the joint portion of the molded material (sheet joint portion), in particular in the sheet joint portion, the bent hem portion, etc. of the inner surface of a bag-like member. In this case, the joint portion of the molded material is highly likely to be exposed to a corrosive environment in an uncovered state. Hence, the corrosion resistance of the joint portion of the molded material is compensated for by using an anti-rust subsidiary material such as body sealer, under-coating, adhesives, or bag-like portion wax. The use of these anti-rust subsidiary materials is not only a factor in the increase of automobile production cost but also a factor in productivity reduction and the weight increase of the car body. Hence, there has been a high demand for an automobile body member in which corrosion resistance can be ensured even when the amounts of these anti-rust subsidiary materials are reduced.

To address these demands, the research and development of surface-treated steel sheets in which the omission of the chemical conversion treatment process, the omission and simplification of the electrodeposition coating process, and the omission and reduction of the amounts of subsidiary materials during automobile production can be achieved at the same time have been actively carried out. Such a surface-treated steel sheet is, after press molding, fashioned into a desired shape by spot welding or the like, and is then subjected to electrodeposition coating, or subjected to intermediate coating in the case where electrodeposition coating is omitted, for example. Hence, it is necessary to enhance the press moldability of the surface-treated steel sheet, provide the coating film with electrical conductivity so that resistance welding or electrodeposition coating can be performed on the surface-treated steel sheet, and provide corrosion resistance.

For example, Patent Literature 1 describes an alloyed zinc-plated steel sheet that includes a resin-based electrically conductive coating film containing zinc powder and that has high corrosion resistance and is weldable. Patent Literature 1 mentions that the zinc powder is preferably contained at a ratio of 30 to 90 mass % in the coating film, and the coating thickness is preferably 2 to 30 µm.

Patent Literature 2 describes an organic composite plated steel sheet in which an anti-rust treatment layer mainly made of a chromium compound is covered with an organic resin coating film containing 3 to 59 volume % of an electrically conductive powder and anti-corrosive particles, with a thickness of 0.5 to 20 µm, and that is excellent in corrosion resistance and is resistance-weldable. Examples of Patent Literature 2 mention using iron phosphide, Fe—Si alloy, Fe—Co alloy, or the like as the electrically conductive powder, and also mention being excellent in corrosion resistance and spot weldability.

Patent Literature 3 describes a Ni-containing zinc-electroplated steel sheet for automobile repair parts in which a chromate underlayer treatment layer that improves corrosion resistance and coating adhesiveness is covered with an organic resin layer containing 25 to 45 mass % of an electrically conductive pigment containing iron phosphide as a main component and anti-corrosive particles, with a thickness of 2 to 8 µm, and that is excellent in corrosion resistance, resistance weldability, etc. Examples of Patent Literature 3 give both a water-based and a solvent-based resin for coating material as examples, and mention that the coating composition for resin covering formation may be either of a water-based one and a solvent-based one.

Patent Literature 4 describes, as a metal surface coating material capable of forming a weldable, corrosion resistant covering film having electrical conductivity, a water-based coating material containing 10 to 30 mass % of a specific organic binder and 30 to 60 mass % of an electrically conductive powder. Patent Literature 4 gives zinc, aluminum, graphite, carbon black, molybdenum sulfide, and iron phosphide as examples of the electrically conductive powder suitable for the preparation of the water-based coating material.

Patent Literature 5 and Patent Literature 6 describe an organic-covered steel sheet for automobiles in which the surface of a zinc-based plated steel sheet or an aluminum-based plated steel sheet is covered with a resin-based second layer covering film containing an electrically conductive pigment and an anti-rust additive via a first layer covering film that enhances the adhesiveness to the plating layer, and thereby both excellent corrosion resistance and weldability are achieved. Patent Literatures 5 and 6 give a water-based composition as an example of the coating composition for the formation of the first layer covering film, and give both a water-based and a solvent-based composition as examples of the coating composition for the formation of the second layer covering film. Further, Patent Literatures 5 and 6 mention that an electrically conductive pigment is contained at a ratio of 5 to 70 volume % in a second layer covering film with a film thickness of 1 to 30 µm, and give, as preferred examples of the electrically conductive pigment, a metal, an alloy, electrically conductive carbon, iron phosphide, a carbide, and a semiconductor oxide.

Patent Literature 7 describes a coated metal material that includes an electrically conductive coating film containing particles of an alloy or a compound of a metal element and a semi-metal element as electrically conductive particles and a specific urethane-based resin and that has high corrosion resistance and is weldable. Patent Literature 7 mentions that the electrically conductive particle is preferably an alloy or a compound containing 50 mass % or more Si, and more preferably ferrosilicon containing 70 mass % or more Si.

Here, as a technology using, among electrically conductive particles other than metal particles, electrically conductive ceramic particles, for example, Patent Literature 8 describes an electrically conductive material-covered corrosion resistant metal material in which a core metal is covered with a cladding layer made of a corrosion resistant metal and further the cladding layer is covered with a surface treatment layer composed of pieces of an electrically conductive material and any resin that binds these pieces, and that is excellent in corrosion resistance and electrical conductivity. Patent Literature 8 gives, as the corrosion resistant metal, a corrosion resistant metal selected from titanium, zirconium, tantalum, and niobium, and alloys of these, and gives, as the electrically conductive material, at least one electrically conductive material selected from a carbon material, an electrically conductive ceramic, and a metal powder.

Patent Literature 9 and Patent Literature 10 describe a surface-treated steel sheet that is obtained by applying a treatment liquid for composite covering formation to the surface of a zinc-based plated steel sheet, immediately after that performing baking at a sheet temperature in the range of 90 to 150° C., and performing air cooling to form a composite covering film at 0.1 to 2.0 g/m² on the surface of the steel sheet, and that is excellent in corrosion resistance, powdering resistance, lubricity, and coating material adhesiveness. Patent Literatures 9 and 10 mention that the composite covering film is formed using a magnesium primary phosphate aqueous solution in which $P_2O_5/MgO=1.2\pm0.1$ (molar ratio), and contains an amorphous inorganic-based component that is soluble in an acidic aqueous solution and insoluble in a neutral or alkaline aqueous solution and contains 5 mass % or more Mg.

Patent Literature 11 describes an organic composite plated steel sheet that includes an organic covering film obtained by applying, to a chromate-covered plated steel sheet with 10 to 150 mg/m² chromium attached, 0.5 to 3.0 g/m² of a resin composition in which an amount in the range of 10 to 80 parts by weight on a solid content basis of one or two or more of powders and colloids (sols) of $SiO_2$, $Cr_2O_3$, $Fe_2O_3$, $Fe_3O_4$, MgO, $ZrO_2$, $SnO_2$, $Al_2O_3$, and $Sb_2O_5$ having a particle diameter of 2 to 12 nm are added to 100 parts by weight on a solid content basis of a resin obtained by modifying an aromatic epoxy resin with a urethane resin and containing 10 to 80 weight % on a solid content basis of the aromatic epoxy resin, and performing curing. Patent Literature 11 mentions that the organic composite plated steel sheet satisfies the adhesiveness to a coating material, continuous weldability, and post-processing bare corrosion resistance at the same time, and can be widely used for anti-rust steel sheets of car bodies, home electrical appliances, building materials, etc.

In addition, Patent Literature 12 mentions that an alloyed zinc-hot-dipped steel sheet excellent in powder coatability can be obtained by setting the alloying index of alloyed zinc hot dipping and the surface roughness to prescribed values.

CITATION LIST

Patent Literature

Patent Literature 1: JP S55-17508A
Patent Literature 2: JP H9-276788A
Patent Literature 3: JP 2000-70842A
Patent Literature 4: JP 2003-513141T
Patent Literature 5: JP 2005-288730A
Patent Literature 6: JP 2005-325427A
Patent Literature 7: JP 2004-42622A
Patent Literature 8: JP 2003-268567A
Patent Literature 9: JP 2002-206174A
Patent Literature 10: JP 2002-206173A
Patent Literature 11: JP H7-224389A
Patent Literature 12: JP 2003-286556A

SUMMARY OF INVENTION

Technical Problem

For surface-treated metal sheets widely used for automobile members, machine members, home electrical appliance members, building materials, etc., it is necessary to enhance the adhesiveness to a coating treatment film after coating in order to enhance corrosion resistance after coating. On the other hand, also weldability is required.

However, although the adhesiveness to a coating treatment film and weldability are researched and developed in the technologies described in the literatures mentioned above, the present situation is that further improvement is desired while the current required level is increasing.

Thus, an object of the present invention is to provide a surface-treated metal sheet excellent in both the adhesiveness to a coating treatment film after coating and weldability, a coated member using the surface-treated metal sheet, and a method for producing the coated member.

Solution to Problem

<1>
A surface-treated metal sheet including:
a metal sheet; and
a coating film placed on at least one major surface of the metal sheet,
in which the coating film contains oxide particles, a binder resin, and electrically conductive particles,
the amount of the electrically conductive particles contained is 5 to 30 mass % relative to the coating film,
the oxide particles include non-doped oxide particles and/or doped oxide particles,
the non-doped oxide particles include at least one kind selected from the group consisting of zinc oxide particles, tin oxide particles, magnesium oxide particles, calcium oxide particles, and strontium oxide particles,
the doped oxide particles include at least one kind selected from the group consisting of doped zinc oxide particles and doped tin oxide particles,
the amount of the oxide particles contained is 1 to 30 mass % relative to the coating film in a case where the oxide particles include the doped oxide particles, and is 1 to 10 mass % relative to the coating film in a case where the oxide particles do not include the doped oxide particles, and
the amount of the coating film attached to the major surface is 2 to 20 g/m².
<2>
The surface-treated metal sheet according to <1>, in which the average particle diameter of the oxide particles is 0.2 to 5 μm.
<3>
The surface-treated metal sheet according to <1> or <2>, in which the binder resin is a water-soluble or water-dispersible water-based resin.

<4>

The surface-treated metal sheet according to any one of <1> to <3>, in which the electrically conductive particles include at least one kind selected from the group consisting of non-oxide ceramic particles, iron alloy particles, and stainless steel particles.

<5>

The surface-treated metal sheet according to any one of <1> to <4>, in which the electrically conductive particles include two or more kinds of non-oxide ceramic particles and at least one kind selected from the group consisting of iron alloy particles and stainless steel particles, and the mass ratio between the non-oxide ceramic particles and the at least one kind selected from the group consisting of the iron alloy particles and the stainless steel particles (the non-oxide ceramic particles/the at least one kind selected from the group consisting of the iron alloy particles and the stainless steel particles) is 1/9 to 8/2.

<6>

The surface-treated metal sheet according to any one of <1> to <5>, in which the coating film further contains anti-corrosive particles.

<7>

The surface-treated metal sheet according to <6>, in which the anti-corrosive particles contain at least one selected from the group consisting of aluminum tripolyphosphate, Zn, Mg, Al, Ti, Zr, and Ce salts of phosphoric acid and phosphorous acid, a hydrocalumite-treated phosphoric acid compound, Ca ion exchange silica, and amorphous silica with an oil absorption of 100 to 1000 ml/100 g, a specific surface area of 200 to 1000 $m^2/g$, and an average particle diameter of 2.0 to 30 μm.

<8>

The surface-treated metal sheet according to <7>, in which the oxide particles include the doped oxide particles, and the aluminum tripolyphosphate is aluminum tripolyphosphate containing Mg.

<9>

The surface-treated metal sheet according to any one of <1> to <8>, in which the metal sheet is a zinc-based plated steel sheet or an aluminum-based plated steel sheet.

<10>

A coated member including:

a molded material using the surface-treated metal sheet according to any one of <1> to <9> as a material;

a chemical conversion treatment covering film located on the coating film of the molded material; and a coating treatment film located on the chemical conversion treatment covering film.

<11>

A method for producing a coated member, including:

a step of performing chemical conversion treatment on a molded material obtained by molding the surface-treated metal sheet according to any one of <1> to <9> and forming a chemical conversion treatment covering film on the coating film; and a step of forming a coating treatment film on the chemical conversion treatment covering film.

Advantageous Effects of Invention

According to the present invention, a surface-treated metal sheet excellent in both the adhesiveness to a coating treatment film after coating and weldability, a coated member using the surface-treated metal sheet, and a method for producing the coated member can be provided.

DESCRIPTION OF EMBODIMENTS

The present invention discloses roughly two means as means for providing a surface-treated metal sheet excellent in both the adhesiveness to a coating treatment film after coating and weldability and a coated member using the surface-treated metal sheet.

Embodiments that are examples of the present invention will now be described. In the present specification, the numerical ranges shown by "to" indicate the range in which the numerical values written before and after "to" are included.

I. First Embodiment

First, a surface-treated metal sheet according to a first embodiment is described.

<Surface-Treated Metal Sheet>

The surface-treated metal sheet according to the first embodiment includes a metal sheet and a coating film (hereinafter, occasionally referred to as a "resin coating film") placed on at least one major surface of the metal sheet, the coating film contains oxide particles, a binder resin, and electrically conductive particles, the amount of electrically conductive particles contained is 5 to 30 mass % relative to the coating film, the oxide particles include non-doped oxide particles, the non-doped oxide particles include at least one kind selected from the group consisting of zinc oxide particles, tin oxide particles, magnesium oxide particles, calcium oxide particles, and strontium oxide particles, the amount of oxide particles contained is 1 to 10 mass % relative to the coating film, and the amount of the coating film attached to the major surface mentioned above is 2 to 20 $g/m^2$.

The surface-treated metal sheet according to the first embodiment is excellent in both the adhesiveness to a coating treatment film after coating and weldability by virtue of the configuration mentioned above. The reason is not necessarily clear, but is presumed as follows.

As described above, a molded material used for an automobile body member as an outer sheet is generally subjected to coating. In this case, on the resin coating film of the surface-treated metal sheet, chemical conversion treatment is generally performed before coating, and a chemical conversion treatment covering film is formed. A typical example of the chemical conversion treatment covering film is an oxychloride covering film such as a phosphate covering film, and the chemical conversion treatment liquid for forming the oxychloride covering film such as a phosphate covering film exhibits acidity (e.g., a pH of 2 to 3).

Figure 1A:
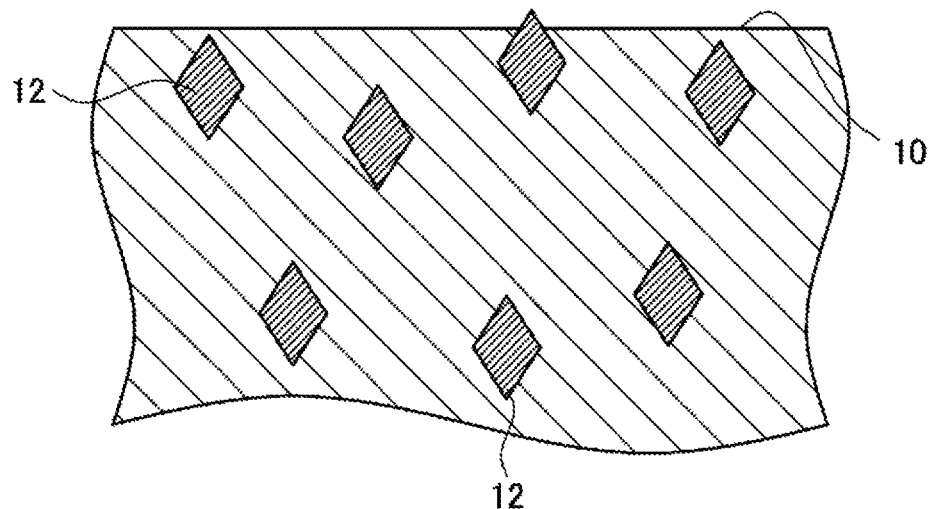
FIG. 1A is a schematic diagram for describing a presumed action by which the adhesiveness to a coating treatment film is improved in a surface-treated metal sheet according to the present embodiment.

When the prescribed contained amount mentioned above of non-doped oxide particles are put in the resin coating film of the surface-treated metal sheet, the non-doped oxide particles are present in a state where some of them are exposed on the surface of the resin coating film and others are dispersed in the interior of the outer layer of the resin coating film (see FIG. 1A). Each of the zinc oxide particle, the tin oxide particle, the magnesium oxide particle, the calcium oxide particle, and the strontium oxide particle has the property of being dissolved in an acidic solution (e.g., a pH of 2 to 3).

Figure 1B:
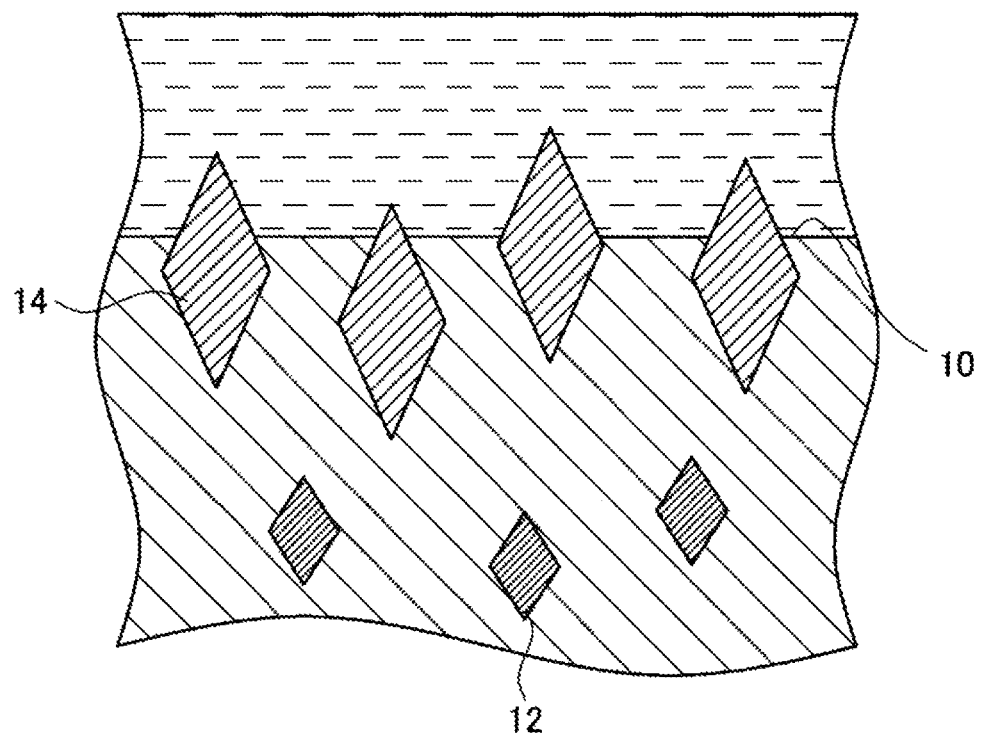
FIG. 1B is a schematic diagram for describing the presumed action by which the adhesiveness to a coating treatment film is improved in the surface-treated metal sheet according to the present embodiment.
Figure 1C:
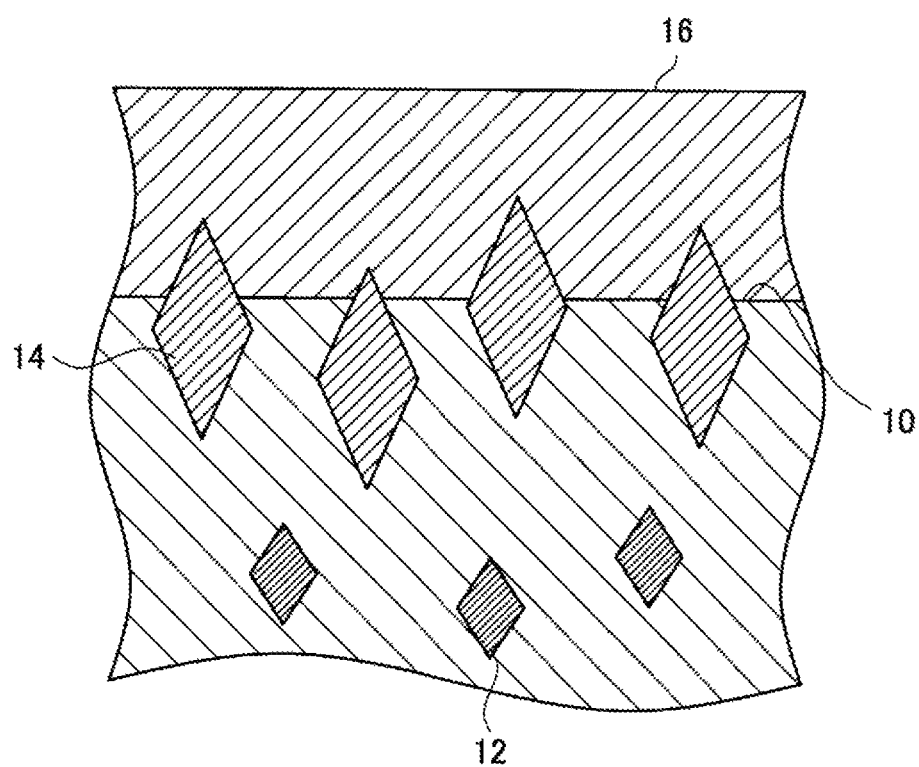
FIG. 1C is a schematic diagram for describing the presumed action by which the adhesiveness to a coating treatment film is improved in the surface-treated metal sheet according to the present embodiment.

Hence, when chemical conversion treatment with an acidic chemical conversion treatment liquid is performed on the resin coating film containing non-doped oxide particles, the non-doped oxide particles exposed on the surface of the resin coating film are dissolved by the acidic chemical conversion treatment liquid. Then, the pH of their vicinity increases, and components of the chemical conversion treatment liquid (e.g., an oxychloride such as a phosphate) deposit and grow. Thereby, a chemical conversion treatment covering film is formed. It is presumed that at this time also the non-doped oxide particles existing in the interior of the outer layer of the resin coating film are dissolved by the acidic chemical conversion treatment liquid, and components of the chemical conversion treatment liquid enter the interior of the outer layer of the resin coating film and deposit, and grow in a wedge form so as to protrude from the interior to the surface of the outer layer of the resin coating film (see FIG. 1B). When a coating treatment film based on coating is formed on the chemical conversion treatment covering film in this state (see FIG. 1C), the adhesiveness between the resin coating film and the coating treatment film (in particular, the secondary adhesiveness after a warm salt water test) is further enhanced by, in addition to the high adhesiveness by the chemical conversion treatment covering film itself, the anchor effect by a crystal of the chemical conversion treatment covering film that has grown in a wedge form (e.g., a crystal of an oxychloride such as a phosphate).

Here, the presence or absence of a crystal of the chemical conversion treatment covering film (e.g., a crystal of an oxychloride such as a phosphate) can be checked by surface observation with a scanning electron microscope (SEM) or from diffraction peaks obtained by X-ray diffraction analysis.

The resin coating film increases in electrical conductivity by setting the attached amount in the range mentioned above and putting in electrically conductive particles in the range mentioned above, and is also excellent in weldability because there is little hindrance to electrical conductivity caused by the non-doped oxide particles.

From the above, it is presumed that the surface-treated metal sheet according to the first embodiment is excellent in both the adhesiveness to a coating treatment film after coating and weldability by virtue of the configuration mentioned above.

In the first embodiment, in FIG. 1, 10 represents the resin coating film, 12 represents the oxide particle, 14 represents the crystal of the chemical conversion treatment covering film (e.g., a crystal of an oxychloride such as a phosphate), and 16 represents the coating treatment film.

In the surface-treated metal sheet according to the first embodiment, anti-corrosive particles may be contained in the resin coating film. The anti-corrosive particles, depending on their types, are dissolved by an acidic chemical conversion treatment liquid. However, when non-doped oxide particles are put in the resin coating film along with the anti-corrosive particles, the non-doped oxide particles are actively dissolved by the acidic chemical conversion treatment liquid, and accordingly the anti-corrosive particles are dissolved less easily. Thereby, corrosion resistance is easily improved.

In the surface-treated metal sheet according to the first embodiment, the resin coating film may be formed on both surfaces (both major surfaces) of the metal sheet, or may be formed only on one surface (one major surface) of the metal sheet, in accordance with the use. The resin coating film may be formed on part of the surface of the metal sheet, or the entire surface of the metal sheet may be covered. The part of the metal sheet where the resin coating film is formed is excellent in the adhesiveness to a coating treatment film and resistance weldability. The part is excellent also in corrosion resistance and moldability.

The surface-treated metal sheet according to the first embodiment will now be described in detail.
[Metal Sheet]

As the metal sheet, various metal sheets of steel (iron-based alloys), aluminum and alloys of aluminum, and magnesium and alloys of magnesium are given.

Examples of the steel sheet include known plated steel sheets such as a zinc-based plated steel sheet and an aluminum-based plated steel sheet. The steel sheet may be a plain steel sheet or a steel sheet containing an additive element such as chromium. However, in the case of press molding, the steel sheet is preferably a steel sheet in which the types and added amounts of additive elements and the metal structure are appropriately controlled so that desired molding followability is provided.

Examples of the zinc-based plating layer of the zinc-based plated steel sheet include a plating layer made of zinc, an alloy plating layer of zinc and at least one of aluminum, cobalt, tin, nickel, iron, chromium, titanium, magnesium, and manganese, and various zinc-based alloy plating layers further containing another metal element or non-metal element (e.g., a quaternary alloy plating layer of zinc, aluminum, magnesium, and silicon). However, in the zinc-based plating layer, the alloy components other than zinc are not particularly limited.

These zinc-based plating layers may further contain, as a small amount of a different metal element or impurity, cobalt, molybdenum, tungsten, nickel, titanium, chromium, aluminum, manganese, iron, magnesium, lead, bismuth, antimony, tin, copper, cadmium, arsenic, or the like, and may contain an inorganic substance such as silica, alumina, or titania.

Examples of the aluminum-based plating layer of the aluminum-based plated steel sheet include a plating layer made of aluminum, an alloy plating layer of aluminum and at least one of silicon, zinc, and magnesium (e.g., an alloy plating layer of aluminum and silicon, an alloy plating layer of aluminum and zinc, and a tertiary alloy plating layer of aluminum, silicon, and magnesium), and the like.

The zinc-based plated steel sheet and the aluminum-based plated steel sheet may also be a multiple-layer plated steel sheet in combination with another type of plating layer (e.g., an iron plating layer, an alloy plating layer of iron and phosphorus, a nickel plating layer, a cobalt plating layer, etc.).

The method for forming the plating layer of the plated steel sheet is not particularly limited. For example, the formation of the plating layer may use electroplating, electroless plating, hot dipping, vapor deposition plating, dispersion plating, and the like. The plating layer may be formed by either the continuous system or the batch system. After the formation of the plating layer, treatment such as zero spangle treatment that is an external appearance uniformity treatment, annealing treatment that is a modification treatment of the plating layer, or temper rolling for adjusting the surface condition or the material quality may be performed.

[Resin Coating Film]

The resin coating film is placed on at least one major surface (that is, at least one surface) of the metal sheet described above. The resin coating film contains a binder resin, electrically conductive particles, and non-doped oxide particles. The resin coating film may contain anti-corrosive particles and other additives, as necessary.

(Non-Doped Oxide Particles)

The non-doped oxide particles can improve the adhesiveness between the resin coating film and the coating treatment film via the chemical conversion treatment covering film, as described above. The non-doped oxide particles include at least one kind selected from the group consisting of zinc oxide particles, tin oxide particles, magnesium oxide particles, calcium oxide particles, and strontium oxide particles. Among these, at least one kind selected from the group consisting of magnesium oxide particles, zinc oxide particles, tin oxide particles, and calcium oxide particles are preferable as the oxide particles in terms of improving the adhesiveness to a coating treatment film.

The zinc oxide particles, after dissolved by the chemical conversion treatment liquid, promote the growth of the crystal of the chemical conversion treatment covering film (e.g., a crystal of an oxychloride such as a phosphate); therefore, the adhesiveness between the resin coating film and the coating treatment film can be further improved by the anchor effect of the crystal of the chemical conversion treatment covering film.

The magnesium oxide particles, the calcium oxide particles, and the strontium oxide particles (in particular, the magnesium oxide particles, the calcium oxide particles, and the tin oxide particles), after dissolved by the chemical conversion treatment liquid, are incorporated into the chemical conversion treatment covering film. A chemical conversion treatment covering film containing Mg, Ca, Sn, or Sr, which has corrosion resistance, is formed, and corrosion resistance can be improved more.

The average particle diameter of the non-doped oxide particles is not particularly limited, but is preferably 0.2 to 5 μm, more preferably 0.3 to 4 μm, and still more preferably 0.4 to 2.5 μm. When the average particle diameter of the non-doped oxide particles is set to 0.2 to 5 μm, the crystal of the chemical conversion treatment covering film to be formed (e.g., a crystal of an oxychloride such as a phosphate) is likely to grow in a wedge form, and the adhesiveness between the resin coating film and the coating treatment film can be further improved by the anchor effect of the crystal of the chemical conversion treatment covering film.

The "average particle diameter" of the non-doped oxide particles refers to the average primary particle diameter in the case where the non-doped oxide particles existing in the resin coating film are present singly, and refers to the average secondary particle diameter that indicates the particle diameter of the non-doped oxide particle in cohesion in the case where non-doped oxide particles are present in cohesion; and is preferably found by the following measurement method. First, the surface-treated metal sheet on which the resin coating film is formed is cut to expose a cross section thereof, and the cross section is polished. The cross section thus obtained is observed with an electron microscope, and an observation image of the cross section in the resin coating film is obtained. Several non-doped oxide particles are selected from those present in the visual field of the observation image, the length of the long side and the length of the short side of each oxide particle are measured, the average value of the lengths of the long sides and the average value of the lengths of the short sides are calculated, and these calculated values are further averaged; thus, the average particle diameter is calculated.

The numerical value of the average particle diameter varies a little with the measurement method. For example, it may vary with the measurement principle in the case of using a particle size distribution meter, and with the image processing method in the case of image analysis. However, the range of the particle diameter of the non-doped oxide particle prescribed in the present specification is one taking such variations into account, and the expected effect is stably obtained by a particle diameter obtained by any method, provided that the particle diameter is in the range prescribed in the present specification.

The amount of non-doped oxide particles contained is 1 to 10 mass % relative to the resin coating film (the total solid content of the coating film).

When the amount of non-doped oxide particles contained is less than 1 mass %, the component crystal of the chemical conversion treatment covering film to be formed (e.g., a crystal of an oxychloride such as a phosphate) is less likely to be formed in the interior of the outer layer of the resin coating film, and consequently it is difficult to obtain the adhesiveness between the resin coating film and the coating treatment film by the anchor effect of the chemical conversion treatment covering film. On the other hand, when the amount of non-doped oxide particles contained is more than 10 mass %, the formation of the component crystal of the chemical conversion treatment covering film to be formed may reach a maximum, and accordingly the adhesiveness between the resin coating film and the coating treatment film may reach a maximum; and the ratios of the electrically conductive particles and the anti-corrosive particles in the resin coating film are reduced, and consequently the properties of weldability, corrosion resistance before coating, etc. may be insufficient.

The amount of non-doped oxide particles contained is preferably 2.5 to 7.5 mass % in terms of further improving the adhesiveness between the resin coating film and the coating treatment film by the anchor effect of the crystal of the chemical conversion treatment covering film.

(Binder Resin)

The binder resin serves as a binding agent that binds the components in the resin coating film. The binder resin may be either of a water-soluble or water-dispersible water-based resin that is dissolved or dispersed in water and a solvent-based resin that is dissolved or dispersed in an organic solvent, but is preferably a water-based resin in terms of production cost and environmental compatibility.

The water-based resin is not particularly limited, and examples include water-soluble or water-dispersible resins such as a polyester resin, a urethane resin, an acrylic resin, an epoxy resin, and a phenolic resin, and a mixed resin of two or more of these resins.

In the case where a polyester resin is used as the water-based resin, the molecular weight is preferably 10,000 to 30,000. If the molecular weight is less than 10,000, it may be difficult to ensure sufficient processability. On the other hand, if the molecular weight is more than 30,000, the area of the bonding site of the resin itself is reduced, and it may be difficult to ensure excellent adhesiveness to a coating treatment film. Furthermore, when crosslinking is performed using a hardening agent such as melamine, the crosslinking reaction may not be sufficiently produced, and performance as a resin coating film may be reduced.

In the case where a urethane resin is used as the water-based resin, the urethane resin is preferably in an emulsion form with an emulsion particle diameter of 10 to 100 nm (more preferably 20 to 60 nm). When the emulsion particle diameter is too small, the cost may be increased. On the other hand, when the emulsion particle diameter is too large, the gap between emulsions may be increased when the resin is made into a coating film, and barrier properties as a resin coating film may be reduced. The type of the urethane resin is not particularly limited, and examples include an ether-based type, a polycarbonate-based type, an ester-based type, an acrylic graphite type, and the like. These may be used singly, or may be used in combination.

On the other hand, examples of the solvent-based resin include a polyester resin, a urethane resin, an epoxy resin, and an acrylic resin, a mixed resin of two or more of these resins, and the like.

Here, the binder resin may be a crosslinked resin having a crosslinked structure, or may be a non-crosslinked resin not having a crosslinked structure. The binder resin is preferably a non-crosslinked resin in terms of forming the resin coating film at low temperature.

The crosslinking agent (hardening agent) that provides the binder resin with a crosslinked structure is preferably a water-soluble crosslinking agent. Specifically, melamine, an isocyanate, and the like are preferable as the crosslinking agent. The amount of the crosslinking agent added is not particularly limited, but is preferably 5 parts by mass to 30 parts by mass relative to 100 parts by mass of the resin solid content. If the amount of the crosslinking agent added is less than 5 parts by mass, the crosslinking reaction with the resin may not proceed sufficiently, and performance as a coating film may be insufficient. On the other hand, if the amount of the crosslinking agent added is more than 30 parts by mass, the crosslinking reaction may proceed excessively and the resin coating film may be excessively hardened, and consequently processability may be reduced.

The amount of the binder resin contained is not particularly limited, but is preferably 20 to 80 mass % relative to the resin coating film (the total solid content of the coating film).

When the amount of the binder resin contained is less than 20 mass %, the function as a binder may not be exhibited, and the cohesive force of the resin coating film may be reduced; hence, a fracture in the coating film (a cohesive failure of the coating film) is likely to occur when an adhesiveness test or molding is performed. If the amount of the binder resin contained is more than 80 mass %, the ratio of the pigment component contained in the resin coating film is reduced, and it may be difficult to achieve all of weldability, corrosion resistance, and post-coating adhesiveness.

The amount of the binder resin contained is more preferably 25 to 70 mass % and still more preferably 30 to 60 mass % relative to the resin coating film (the total solid content of the coating film) in terms of bringing out the binder function and achieving all of weldability, corrosion resistance, and the adhesiveness to a coating treatment film.

(Electrically Conductive Particles)

The electrically conductive particles contribute to the improvement of weldability by providing the resin coating film with electrical conductivity. The electrically conductive particles contained in the resin coating film are not particularly limited, and examples include non-oxide ceramic particles, iron alloy particles, stainless steel particles, particles of a material other than iron alloys (metal particles, metal alloy particles, etc.), and the like.

The electrically conductive particles are preferably, among these, at least one kind selected from the group consisting of non-oxide ceramic particles, iron alloy particles, and stainless steel particles.

Even in the case where the composition for resin coating formation is a water-based composition, non-oxide ceramic particles and stainless steel particles are less likely to be degraded in the composition, and can maintain high electrical conductivity. Thereby, excellent weldability of the surface-treated metal sheet can be maintained for a long period of time.

In the case where the composition for resin coating formation is a water-based composition, iron alloy particles are inferior in stability in an alkaline water-based composition, but are excellent in stability to some degree in an acidic water-based composition containing a certain kind of polyester resin or the like. Hence, in the case where the composition for resin coating formation is an acidic water-based composition, excellent weldability of the surface-treated metal sheet can be maintained for a long period of time.

First, the non-oxide ceramic particle is described.

The non-oxide ceramic that forms the non-oxide ceramic particle is not particularly limited, but is preferably a non-oxide ceramic (a boride ceramic, a carbide ceramic, a nitride ceramic, a silicide ceramic, or the like) of which the electrical resistivity (volume resistivity, or specific resistance) at 25° C. is in the range of $0.1 \times 10^{-6}$ to $185 \times 10^{-6}$ Ωcm.

Here, the non-oxide ceramic refers to a ceramic made of elements other than oxygen or a compound not containing oxygen. The boride ceramic, the carbide ceramic, the nitride ceramic, and the silicide ceramic refer to non-oxide ceramics containing boron B, carbon C, nitrogen N, and silicon Si as a main non-metal constituent element, respectively. All of these are a non-oxide ceramic having an electrical resistivity at 25° C. of less than $0.1 \times 10^{-6}$ Ωcm.

Since the non-oxide ceramic particle has high electrical conductivity, the contained amount for providing the resin coating film with sufficient electrical conductivity is allowed to be a smaller amount. Consequently, the impact on the corrosion resistance and moldability of the surface-treated metal sheet due to containing electrically conductive particles is smaller. For reference, the electrical resistivity of pure metals is in the range of $1.6 \times 10^{-6}$ Ωcm (Ag simple substance) to $185 \times 10^{-6}$ Ωcm (Mn simple substance); therefore, a non-oxide ceramic of which the electrical resistivity is in the range of $0.1 \times 10^{-6}$ to $185 \times 10^{-6}$ Ωcm has excellent electrical conductivity at a level substantially equal to that of pure metals.

Here, examples of the non-oxide ceramic particle include the following.

Examples of the boride ceramic particle include a boride ceramic particle of each transition metal of group IV (Ti, Zr, and Hf), group V (V, Nb, and Ta), and group VI (Cr, Mo, and W) of the periodic table, Mn, Fe, Co, Ni, a rare earth element, and group II (Ca, Sr, and Ba) other than Be or Mg.

However, particles of some boride ceramics of Be having an electrical resistivity at 25° C. of more than $185 \times 10^{-6}$ Ωcm (e.g., $Be_2B$, $BeB_6$, etc.) have low electrical conductivity, and may reduce the weldability of the surface-treated metal sheet. Further, particles of boride ceramics of Mg ($Mg_3B_2$, $MgB_2$, etc.) have low stability to water or acid, and may reduce the weldability of the surface-treated metal sheet.

Examples of the carbide ceramic particle include a carbide ceramic particle of each transition metal of group IV (Ti, Zr, and Hf), group V (V, Nb, and Ta), and group VI (Cr, Mo, and W) of the periodic table, Mn, Fe, Co, and Ni. Particles of carbide ceramics of rare earth elements and group II (e.g., $YC_2$, $LaC_2$, $CeC_2$, $PrC_2$, $Be_2C$, $Mg_2C_3$, $SrC_2$, etc.) are likely to be hydrolyzed in a moist atmosphere, and may reduce the weldability of the surface-treated metal sheet.

Examples of the nitride ceramic particle include a nitride ceramic particle of each transition metal of group IV (Ti, Zr, and Hf), group V (V, Nb, and Ta), and group VI (Cr, Mo, and W) of the periodic table, Mn, Fe, Co, and Ni. Particles of nitrides of rare earth elements and group II (e.g., LaN, $Mg_3N_2$, $Ca_3N_2$ etc.) are likely to be hydrolyzed in a moist atmosphere, and may reduce the weldability of the surface-treated metal sheet.

Examples of the silicide ceramic particle include a silicide particle of each transition metal of group IV (Ti, Zr, and Hf), group V (V, Nb, and Ta), and group VI (Cr, Mo, and W) of the periodic table, Mn, Fe, Co, and Ni. Particles of silicides of rare earth elements and group II (e.g., LaSi, $Mg_2Si$, $SrSi_2$, $BaSi_2$, etc.) are likely to react with water to produce hydrogen in a moist atmosphere, and may reduce the weldability of the surface-treated metal sheet.

Further, examples of the non-oxide ceramic particle include a particle of a mixture of two or more selected from the group consisting of these boride ceramics, carbide ceramics, nitride ceramics, and silicide ceramics, a cermet particle obtained by mixing these ceramics with a metal bonding material and performing sintering, and the like.

In the case of producing the resin coating film out of a water-based composition, the standard electrode potential of the metal constituting a part of the cermet particle is preferably −0.3 V or more. In the case where the standard electrode potential of the metal constituting a part of the cermet particle is less than −0.3 V, when the cermet particle exists in the water-based composition for a long period of time, a rust layer or a thick oxide insulating layer is likely to be produced on the surface of the particle, and the electrical conductivity of the particle may be lost. Examples of the cermet particle having water degradation resistance include WC-12Co, WC-12Ni, TiC-20TiN-15WC-10$Mo_2$C-5Ni, and the like. The standard electrode potentials of Co and Ni are −0.28 V and −0.25 V, respectively, both of which are nobler than −0.3 V, and therefore both metals have water degradation resistance.

Here, among the non-oxide ceramics, Cr-based ceramics (CrB, $CrB_2$, $Cr_3C_2$, $Cr_2N$, CrSi, etc.) have a concern about environmental burdens, and Hf-based ceramics ($HfB_2$, HfC, HfN, etc.) and most of the ceramics based on rare earth elements on the heavier rare earth side than Tb are expensive and are not commercially available; hence, a particle of a non-oxide ceramic other than these ceramics, or a particle of a mixture of two or more of non-oxide ceramics other than these ceramics is preferable.

Further, from the viewpoints of the presence or absence of industrial products, stable distribution on home and abroad markets, prices, electrical resistivity, etc., the non-oxide ceramic particle is more preferably the following non-oxide ceramics, which are given as examples. That is, the non-oxide ceramic particle is more preferably a particle of $BaB_6$ (electrical resistivity: $77\times10^{-6}$ Ωcm), $CeB_6$ (the same: $30\times10^{-6}$ Ωcm), $Co_2B$ (the same: $33\times10^{-6}$ Ωcm), CoB (the same: $76\times10^{-6}$ Ωcm), FeB (the same: $80\times10^{-6}$ Ωcm), $GdB_4$ (the same: $31\times10^{-6}$ Ωcm), $GdB_6$ (the same: $45\times10^{-6}$ Ωcm), $LaB_4$ (the same: $12\times10^{-6}$ Ωcm), $LaB_6$ (the same: $15\times10^{-6}$ Ωcm), $Mo_2B$ (the same: $40\times10^{-6}$ Ωcm), MoB (the same: $35\times10^{-6}$ Ωcm), $MoB_2$ (the same: $45\times10^{-6}$ Ωcm), $Mo_2B_5$ (the same: $26\times10^{-6}$ Ωcm), $Nb_3B_2$ (the same: $45\times10^{-6}$ Ωcm), NbB (the same: $6.5\times10^{-6}$ Ωcm), $Nb_3B_4$ (the same: $34\times10^{-6}$ Ωcm), $NbB_2$ (the same: $10\times10^{-6}$ Ωcm), $NdB_4$ (the same: $39\times10^{-6}$ Ωcm), $NdB_6$ (the same: $20\times10^{-6}$ Ωcm), $PrB_4$ (the same: $40\times10^{-6}$ Ωcm), $PrB_6$ (the same: $20\times10^{-6}$ Ωcm), $SrB_6$ (the same: $77\times10^{-6}$ Ωcm), TaB (the same: $100\times10^{-6}$ Ωcm), $TaB_2$ (the same: $100\times10^{-6}$ Ωcm), TiB (the same: $40\times10^{-6}$ Ωcm), $TiB_2$ (the same: $28\times10^{-6}$ Ωcm), VB (the same: $35\times10^{-6}$ Ωcm), $VB_2$ (the same: $150\times10^{-6}$ Ωcm), $W_2B_5$ (the same: $80\times10^{-6}$ Ωcm), $YB_4$ (the same: $29\times10^{-6}$ Ωcm), $YB_6$ (the same: $40\times10^{-6}$ Ωcm), $YB_{12}$ (the same: $95\times10^{-6}$ Ωcm), $ZrB_2$ (the same: $60\times10^{-6}$ Ωcm), MoC (the same: $97\times10^{-6}$ Ωcm), $Mo_2C$ (the same: $100\times10^{-6}$ Ωcm), $Nb_2C$ (the same: $144\times10^{-6}$ Ωcm), NbC (the same: $74\times10^{-6}$ Ωcm), $Ta_2C$ (the same: $49\times10^{-6}$ 12 cm), TaC (the same: $30\times10^{-6}$ Ωcm), TiC (the same: $180\times10^{-6}$ Ωcm), $V_2C$ (the same: $140\times10^{-6}$ Ωcm), VC (the same: $150\times10^{-6}$ Ωcm), WC (the same: $80\times10^{-6}$ Ωcm), $W_2C$ (the same: $80\times10^{-6}$ Ωcm), ZrC (the same: $70\times10^{-6}$ Ωcm), $Mo_2N$ (the same: $20\times10^{-6}$ Ωcm), $Nb_2N$ (the same: $142\times10^{-6}$ Ωcm), NbN (the same: $54\times10^{-6}$ Ωcm), ScN (the same: $25\times10^{-6}$ Ωcm), $Ta_2N$ (the same: $135\times10^{-6}$ Ωcm), TiN (the same: $22\times10^{-6}$ Ωcm), VN (the same: $160\times10^{6}$ Ωcm), ZrN (the same: $14\times10^{-6}$ Ωcm), $CoSi_2$ (the same: $18\times10^{-6}$ Ωcm), $Mo_a$Si (the same: $22\times10^{-6}$ Ωcm), $Mo_5Si_3$ (the same: $46\times10^{-6}$ Ωcm), $MoSi_2$ (the same: $22\times10^{-6}$ Ωcm), $NbSi_2$ (the same: $6.3\times10^{-6}$ Ωcm), $Ni_2Si$ (the same: $20\times10^{-6}$ Ωcm), $Ta_2Si$ (the same: $124\times10^{-6}$ Ωcm), $TaSi_2$ (the same: $8.5\times10^{-6}$ Ωcm), TiSi (the same: $63\times10^{-6}$ Ωcm), $TiSi_2$ (the same: $123\times10^{-6}$ Ωcm), $V_5Si_3$ (the same: $115\times10^{-6}$ Ωcm), $VSi_2$ (the same: $9.5\times10^{-6}$ Ωcm), $W_3Si$ (the same: $93\times10^{-6}$ Ωcm), $WSi_2$ (the same: $33\times10^{-6}$ Ωcm), ZrSi (the same: $49\times10^{-6}$ Ωcm), or $ZrSi_2$ (the same: $76\times10^{-6}$ Ωcm), or a particle of a mixture of two or more selected from these.

The electrical resistivities additionally written in the parentheses of the non-oxide ceramics given as examples are representative values (literature values) of those on the market and in use as industrial materials. These electrical resistivities increase or decrease with the type and amount of impurity elements that have entered the crystal lattice of the non-oxide ceramic. Hence, these materials may be used after checking that the electrical resistivity is in the range of $0.1\times10^{-6}$ to $185\times10^{-6}$ Ωcm by, for example, actually measuring the electrical resistivity at 25° C. using the four-terminal four-probe method and the constant current application system in accordance with JIS K7194, using a resistivity meter Loresta EP (MCP-T360 type) and ESP probes (the diameter of the flat head portion of the terminal: 2 mm) manufactured by Mitsubishi Chemical Analytech Co., Ltd.

Next, the iron alloy particle is described.

The iron alloy particle is an alloy particle of an alloy of at least one selected from the group consisting of Si, V, Mn, W, Mo, Ti, Ni, and Nb, and iron. Examples of the iron alloy powder include ferrosilicon, ferrovanadium, ferromanganese, ferrotungsten, ferromolybdenum, ferrotitanium, ferronickel, ferroboron, ferroniobium, and the like.

Among these, ferrovanadium, ferrosilicon, and ferromanganese are preferable as the iron alloy particle from the viewpoint of corrosion resistance, as well as weldability.

The stainless steel particle will now be described.

The stainless steel particle is an alloy particle in which 10.5 mass % or more Cr is put in Fe (an alloy particle in which the amount of C contained is 1.2 mass % or less).

Next, the properties of the electrically conductive particle described above are described.

The shape of the electrically conductive particle is not particularly limited, but is preferably, for example, a shape close to a sphere, such as a spherical shape, a quasi-spherical shape (e.g., an ellipsoidal shape, a hen's egg-like shape, a rugby ball-like shape, etc.), or a polyhedral shape (e.g., a soccer ball-like shape, a die-like shape, brilliant cut shapes of various jewels, etc.). Electrically conductive particles having a shape close to a sphere are uniformly dispersed in the resin coating film, and easily form an effective current path penetrating in the thickness direction of the resin coating film; and consequently further improve the joinability of the surface-treated metal sheet. On the other hand, electrically conductive particles of a long, thin shape (e.g., a bar-like shape, a needle-like shape, a fibrous shape, etc.) or a planar shape (e.g., a flake-like shape, a flat sheet-like shape, a thin leaf-like shape, etc.) may, in the formation process of the resin coating film, be arranged parallel to the surface of the coating film or be deposited near the interface between the metal sheet (in the case where underlayer treatment is performed on the surface of the metal sheet, the underlayer treatment layer) and the resin coating film; and this makes it difficult to form an effective current path penetrating in the thickness direction of the resin coating film, and may reduce the joinability of the surface-treated metal sheet.

The average particle diameter of the electrically conductive particles is not particularly limited, but is preferably 0.2 to 5 μm and more preferably 0.5 to 2.5 μm. When the average particle diameter of the electrically conductive particles is in the range of 0.2 to 5 μm, an effective current path penetrating in the thickness direction of the resin coating film is easily formed, and the joinability of the surface-treated metal sheet is further improved.

Here, the "average particle diameter" of the electrically conductive particles refers to the average primary particle diameter in the case where the electrically conductive particles existing in the resin coating film are present singly, and refers to the average secondary particle diameter that indicates the particle diameter of the electrically conductive particle in cohesion in the case where electrically conductive particles are present in cohesion; and is preferably found by the following measurement method. First, the surface-treated metal sheet on which the resin coating film is formed is cut to expose a cross section thereof, and the cross section is polished. The cross section thus obtained is observed with an electron microscope, and an observation image of the cross section in the resin coating film is obtained. Several particles of the pigment are selected from those present in the visual field of the observation image, the length of the long side and the length of the short side of each electrically conductive particle are measured, the average value of the lengths of the long sides and the average value of the lengths of the short sides are calculated, and these calculated values are further averaged; thus, the average particle diameter is calculated.

Preferred aspects of the electrically conductive particle are further described.

The electrically conductive particles preferably include two or more kinds of particles of non-oxide ceramic particles and at least one kind selected from the group consisting of iron alloy particles and stainless steel particles. The mass ratio between the non-oxide ceramic particles and the at least one kind selected from the group consisting of iron alloy particles and stainless steel particles (non-oxide ceramic particles/at least one kind selected from the group consisting of iron alloy particles and stainless steel particles) is preferably 1/9 to 8/2, more preferably 1/9 to 7/3, and still more preferably 2/8 to 6/4.

When at least one kind selected from the group consisting of iron alloy particles and stainless steel particles are used in combination with non-oxide ceramic particles at a ratio in the range mentioned above as the electrically conductive particles, the electrical conductivity of the resin coating film is enhanced, and the weldability of the surface-treated metal sheet is further improved. Furthermore, the amount of non-oxide particles with high hardness contained can be reduced. When resistance welding is continuously performed, the occurrence of a phenomenon in which electrically conductive particles get stuck in an electrode is suppressed; thus, during continuous welding, the occurrence of welding failure etc. is suppressed.

Next, the amount of electrically conductive particles contained is described.

The amount of electrically conductive particles contained is 5 to 30 mass % relative to the resin coating film (the total solid content of the coating film).

When the amount of electrically conductive particles contained is less than 5 mass %, the weldability of the surface-treated metal sheet is not sufficiently obtained. When the amount of electrically conductive particles contained is more than 30 mass %, the cohesive force of the coating film is reduced, and accordingly the adhesiveness to a coating treatment film is reduced.

The amount of electrically conductive particles contained is preferably 10 to 20 mass % relative to the resin coating film (the total solid content of the coating film) in terms of weldability, coating adhesiveness, etc.

(Anti-Corrosive Particles)

The resin coating film preferably contains anti-corrosive particles. The anti-corrosive particles can improve the corrosion resistance of particularly the surface of the metal sheet adjacent to the resin coating film of the surface-treated metal sheet.

The anti-corrosive particles that can be contained in the resin coating film is not particularly limited, but preferably contains at least one selected from the group consisting of aluminum tripolyphosphate, Zn, Mg, Al, Ti, Zr, and Ce salts of phosphoric acid and phosphorous acid, hydrocalumite-treated phosphoric acid compounds (as an example, EXPERT NP-530 N5 produced by Toho Ganryo Kogyo Co., Ltd., which is hydrocalumite-treated zinc phosphate), Ca ion exchange silica, and amorphous silica with an oil absorption of 100 to 1000 ml/100 g, a specific surface area of 200 to 1000 $m^2/g$, and an average particle diameter of 2 to 30 μm.

A preferred anti-corrosive particles are, among these, a phosphate-based anti-corrosive particles (aluminum tripolyphosphate, a hydrocalumite-treated phosphoric acid compound, etc.) or a silica-based anti-corrosive particles, or a combination of both from the viewpoint of achieving the corrosion resistance of both the flawed portion and the flat surface portion. In particular, a preferred anti-corrosive particles are at least one selected from the group consisting of aluminum tripolyphosphate, a hydrocalumite-treated phosphoric acid compound, Ca exchange silica, and amorphous silica with an oil absorption of 100 to 1000 ml/100 g, a specific surface area of 200 to 1000 $m^2/g$, and an average particle diameter of 2 to 30 μm.

In the case where the resin coating film contains zinc oxide particles, the resin coating film preferably contains, as anti-corrosive particles, aluminum dihydrogen tripolyphosphate containing Mg. Examples of the aluminum dihydrogen tripolyphosphate containing Mg include magnesium-treated aluminum dihydrogen tripolyphosphate, a mixture of aluminum tripolyphosphate and magnesium hydroxide, and the like. It is presumed that, by aluminum dihydrogen tripolyphosphate containing Mg being contained in the resin coating film, zinc oxide particles, Mg, and aluminum dihydrogen tripolyphosphate react together to form a composite oxide and a composite compound of Zn—Mg and a Zn-phosphoric acid compound, and thereby excellent corrosion resistance is provided.

The oil absorption of silica can be measured in accordance with JIS K 5101-13-2. The specific surface area of silica can be measured by the BET method. The average particle diameter of silica can be measured by a method similar to the method for the average particle diameter of the electrically conductive particles.

The amount of the anti-corrosive particles contained is preferably 5 to 40 mass % relative to the resin coating film (the total solid content of the coating film).

When the amount of the anti-corrosive particles contained is less than 5 mass %, corrosion resistance may not be sufficiently obtained. When the amount of the anti-corrosive particles contained is more than 40 mass %, the processability of the coating film may be reduced, and cohesive force may be reduced.

The amount of the anti-corrosive particles contained is more preferably 7.5 to 35 mass % and still more preferably 10 to 30 mass % relative to the resin coating film (the total solid content of the coating film) in terms of corrosion resistance and processability.

(Other Additives)

The resin coating film may contain other additives. Examples of the other additive include known additives such as an extender pigment, a solid lubricant, and a leveling agent.

Examples of the extender pigment include silica (including colloidal silica), titania, zirconia, and the like.

The solid lubricant can provide the resin coating film with excellent lubricity, and can improve powdering resistance. Examples of the solid lubricant include the solid lubricants of (1) and (2) below.
(1) Polyolefin wax and paraffin wax: for example, polyethylene wax, synthetic paraffin, natural paraffin, microcrystalline wax, a chlorinated hydrocarbon, and the like
(2) Fluorine resin-based wax: for example, a polyfluoroethylene resin (a polytetrafluoroethylene resin, etc.), a polyvinyl fluoride resin, a polyvinylidene fluoride resin, and the like The average particle diameter of the solid lubricant is preferably 0.05 to 25 µm. When the average particle diameter of the solid lubricant is less than 0.05 µm, the area of the lubricant occupying the outer layer of the resin coating film tends to be large due to the surface concentration of the lubricant, and the adhesiveness between the resin coating film and the coating treatment film may be reduced. On the other hand, when the average particle diameter of the solid lubricant is more than 25 µm, the lubricant is likely to fall off from the resin coating film, and a prescribed lubricity may be difficult to obtain and corrosion resistance may be reduced. The average particle diameter of the solid lubricant is more preferably 1 to 15 µm and still more preferably 3 to 10 µm in terms of obtaining excellent coating material adhesiveness, corrosion resistance, lubricity, and powdering resistance.

The softening point of the solid lubricant is preferably 100° C. to 135° C. and more preferably 110 to 130° C. When the softening point of the solid lubricant is 100° C. to 135° C., lubricity and powdering resistance are further improved.

The amount of the solid lubricant contained is preferably 0.1 to 10 mass % relative to the resin coating film (the total solid content of the coating film). When the amount of the solid lubricant contained is less than 0.1 mass %, lubricity may not be sufficiently obtained. When the amount of the solid lubricant contained is more than 10 mass %, the adhesiveness between the resin coating film and the coating treatment film and corrosion resistance may be reduced.

The amount of the solid lubricant contained is more preferably 0.2 to 5 mass % and still more preferably 0.5 to 2.5 mass % relative to the resin coating film (the total solid content of the coating film) in terms of the adhesiveness between the resin coating film and the coating treatment film, lubricity, and corrosion resistance.

(Amount of Resin Coating Film Attached)

The amount of the resin coating film attached (the amount of the total solid content of the resin coating film attached) is 2 to 20 $g/m^2$. When the amount of the resin coating film attached is less than 2 $g/m^2$, the adhesiveness between the resin coating film and the coating treatment film and corrosion resistance are not sufficiently obtained. When the amount of the resin coating film attached is more than 20 $g/m^2$, the reduction in the cohesive force of the coating film and weldability are not sufficiently obtained.

The amount of the resin coating film attached is preferably 2 to 15 $g/m^2$ in terms of the adhesiveness between the resin coating film and the coating treatment film, weldability, and corrosion resistance.

(Formation of Resin Coating Film)

The method for forming the resin coating film is not particularly limited, and known methods may be used. For example, a composition for resin coating formation in which a binder resin, electrically conductive particles, and oxide particles, and anti-corrosive particles and other additives as necessary, are mixed in a solvent is obtained. The solvent may be water or an organic solvent, but is preferably water in terms of production cost and environmental compatibility. That is, the composition for resin coating formation is preferably a water-based composition. Then, the composition for resin coating formation is applied onto at least one surface of a metal sheet, and drying and heating are performed; thus, a resin coating film can be formed.

(Other Aspects of Surface-Treated Metal Sheet)

In the surface-treated metal sheet, a known functional film, such as an underlayer treatment covering film that further improves the adhesiveness of the coating film to the metal sheet, corrosion resistance, etc., may be interposed between the metal sheet and the resin coating film.

The underlayer treatment covering film may be a chromate treatment covering film or an underlayer treatment covering film containing practically no chromium (a chromate-free treatment covering film). Typical examples of the chromate-free treatment liquid are a silica-based treatment liquid containing a silicon compound such as liquid phase silica, gas phase silica, or a silicate as a main covering component, and a zircon-based treatment liquid containing a zircon-based compound as a main covering component. These treatment liquids may be a treatment liquid in which an organic resin is made to coexist with a main covering component. The chromate-free treatment liquid is not limited to a silica-based treatment liquid or a zircon-based treatment liquid. As the chromate-free treatment liquid, various chromium-free treatment liquids for use in coating underlayer treatment are proposed and are expected to be proposed in the future, as well as silica-based treatment liquids and zircon-based treatment liquids. Also such chromium-free treatment liquids may be used.

For the amount of the underlayer treatment covering film attached, an appropriate attached amount may be selected in accordance with the treatment liquid used. For example, in the case of an underlayer treatment covering film based on a silica-based treatment liquid, a normal attached amount is preferably in the range of 1 to 20 mg/m$^2$ on a Si basis.

<Coated Member>

Next, a coated member according to the first embodiment is described.

The coated member according to the first embodiment includes a molded material using the surface-treated metal sheet according to the first embodiment mentioned above as the material, a chemical conversion treatment covering film located on the coating film (the resin coating film) of the molded material, and a coating treatment film located on the chemical conversion treatment covering film.

The molded material is obtained by molding the surface-treated metal sheet described above as the material. The shape of the molded material is not particularly limited, and may have a shape in accordance with the use of the coated member. The molded material may be one in which a plurality of surface-treated metal sheets are joined by welding, adhesion, or the like. Since the surface-treated metal sheet according to the present embodiment is excellent in weldability, a defect such as a crack due to welding is prevented even in the case where the molded material is welded.

The chemical conversion treatment covering film is a film that is located on the resin coating film and is formed by performing chemical conversion treatment on the surface of the resin coating film. The chemical conversion treatment covering film is not particularly limited, but is preferably, for example, a covering film containing a phosphate. Such a covering film containing a phosphate tends to have a structure like that shown in FIG. 1B and FIG. 1C described above because the surface of the resin coating film comes into contact with an acidic chemical conversion treatment liquid during the formation.

Examples of the phosphate include a crystalline or amorphous phosphate. A crystalline phosphate is preferable from the viewpoint of causing a wedge-form phosphate to exist in the chemical conversion treatment covering film.

Examples of the crystalline phosphate include zinc phosphate (hopeite, $Zn_3(PO_4)_2 \cdot 4H_2O$), zinc iron phosphate (phosphophyllite, $Zn_2Fe(PO_4)_2 \cdot 4H_2O$), manganese phosphate (hureaulite, $Mn_5(PO_3(OH))_2(PO_4)_2 \cdot 4H_2O$), manganese iron phosphate (($Mn_{1-x}Ye_x)_5H_2(PO_4)_4 \cdot 4H_2O$; in the formula, x indicates that the iron-based metal material is etched during chemical conversion treatment and the iron component is contained in the covering film; 0<x<1), calcium zinc phosphate (scholzite, $CaZn_2(PO_4)_2 \cdot 2H_2O$), and the like.

Examples of the amorphous phosphate include iron phosphate, tin phosphate, zirconium phosphate, titanium phosphate, hafnium phosphate, and the like.

The chemical conversion treatment covering film may be formed of components other than a phosphate. For example, the chemical conversion treatment covering film may contain a salt of at least one selected from iron, titanium, zirconium, hafnium, indium, tin, bismuth, vanadium, nickel, cerium, molybdenum, and tungsten, and a nitrate ion, a sulfate ion, a fluoride ion, a complex fluoride ion, or a carbonate ion. Specific examples of the salt include titanium oxide, zirconium oxide, hafnium oxide, indium oxide, tin oxide, bismuth oxide, vanadium oxide, nickel oxide, cerium oxide, molybdenum oxide, tungsten oxide, iron sulfide, zirconium fluoride, titanium fluoride, hafnium fluoride, indium fluoride, and the like.

The thickness of the chemical conversion treatment covering film is preferably 0.01 µm to 3 µm, more preferably 0.03 µm to 2 µm, and still more preferably 0.05 µm to 1 µm.

In the case where the chemical conversion treatment covering film contains a crystalline salt, discussing the thickness is not appropriate because the covering film has unevenness caused by the crystal. On the other hand, it is possible to focus on the crystal diameter of the chemical conversion treatment covering film. The crystal diameter of the crystalline phosphate is preferably 0.10 to 5 µm, more preferably 0.30 to 4 µm, and still more preferably 0.50 to 3 µm.

The coating treatment film is located on the chemical conversion treatment covering film. The coating treatment film is a film formed by a known coating treatment such as electrodeposition coating, powder coating, or solvent coating. The coating treatment film may be one layer, or may be multiple layers (for example, a coating treatment film composed of an under-coating layer, an intermediate coating layer, and an over-coating layer, or the like).

Since the molded material includes the prescribed resin coating film and the coating treatment film is formed on the resin coating film via the chemical conversion treatment covering film, the coated member described above is excellent in the adhesiveness between the resin coating film and the coating treatment film. Furthermore, since the surface-treated metal sheet according to the present embodiment is excellent also in weldability, a defect such as a crack due to welding is prevented even in the case where the coated member is welded.

The coated member according to the first embodiment is not particularly limited, and can be widely used for, for example, automobile members (automobile bodies, suspension system members, etc.), machine members (casings, etc.), home electrical appliance members (casings, etc.), building materials (roofs, walls, etc.), etc.

<Method for Producing Coated Member>

Next, a method for producing the coated member according to the first embodiment is described.

The method for producing the coated member according to the present embodiment includes a step of performing chemical conversion treatment on a molded material obtained by molding the surface-treated metal sheet described above and forming a chemical conversion treatment covering film on the coating film (a first step) and a step of forming a coating treatment film on the chemical conversion treatment covering film (a second step).

First, prior to the first step, a molded material is prepared. The molded material is obtained by molding the surface-treated metal sheet according to the first embodiment described above into a target shape. The surface-treated metal sheet may be molded using, for example, known molding techniques such as cutting and press molding. The molded material may be fashioned into a desired shape by welding (spot welding or the like), as necessary.

A known treatment such as degreasing or surface conditioning may be performed on the resin coating film of the molded material on which chemical conversion treatment is to be performed.

Next, chemical conversion treatment is performed on the molded material to form a chemical conversion treatment covering film on the resin coating film. The chemical conversion treatment liquid used for chemical conversion treatment and the treatment conditions may be selected in accordance with the condition and composition of the chemical conversion treatment covering film to be formed, as appropriate.

For example, in the case where the chemical conversion treatment covering film contains a crystalline phosphate, an acidic aqueous solution containing a phosphate ion as an anion and containing at least one selected from zinc, calcium, and manganese as a cation may be used as the chemical conversion treatment liquid. For the purpose of enhancing the reaction rate, it is preferable that ions of a transition metal such as nickel or cobalt, an oxidizing agent such as nitric acid or nitrous acid, or an etchant component such as fluoride ions or complex fluoride ions be further added to the acidic aqueous solution. As acidic aqueous solutions for phosphate treatment in which the types and contained amounts of the anions and the cations mentioned above are appropriately combined, commercially available ones may be used as they are, and examples include "Palbond 860," "Palbond L3020," "Palfos MIA," "Palfos M5," "Palbond 880," "Palbond SX35," "Palbond L47," and "Ferricoat 7" produced by Nihon Parkerizing Co., Ltd., and the like.

The pH of the chemical conversion treatment liquid mentioned above is not particularly limited, but is preferably 1.0 to 5.0 and more preferably 2.0 to 4.0.

The temperature during chemical conversion treatment of the chemical conversion treatment liquid mentioned above is not particularly limited, but is preferably 30° C. to 120° C., more preferably 35° C. to 110° C., and still more preferably 40° C. to 100° C. The time of chemical conversion treatment is not particularly limited, and may be selected in accordance with the target attached amount of the chemical conversion treatment covering film to be formed, as appropriate.

In the case where the chemical conversion treatment covering film contains an amorphous phosphate, an acidic aqueous solution containing a phosphate ion as an anion and containing at least one selected from iron, tin, zirconium, titanium, and hafnium as a cation may be used as the chemical conversion treatment liquid, for example. For the purpose of enhancing the reaction rate, it is preferable that ions of a transition metal such as nickel or cobalt, an oxidizing agent such as nitric acid or nitrous acid, or an etchant component such as fluoride ions or complex fluoride ions be further added to the acidic aqueous solution. As acidic aqueous solutions for phosphate treatment in which the types and contained amounts of the anions and the cations mentioned above are appropriately combined, commercially available ones may be used as they are, and examples include "Palfos 1077," "Palfos 525T," and "Palfos K5100" produced by Nihon Parkerizing Co., Ltd., and the like. The pH of the chemical conversion treatment liquid mentioned above is not particularly limited, but is preferably 1.0 to 5.0 and more preferably 2.0 to 4.0.

As another chemical conversion treatment liquid for forming the chemical conversion treatment covering film, an acidic aqueous solution containing at least one selected from a nitrate ion, a sulfate ion, a fluoride ion, a complex fluoride ion, and a carbonate ion as an anion and containing at least one selected from iron, titanium, zirconium, hafnium, indium, tin, bismuth, vanadium, nickel, cerium, molybdenum, and tungsten as a cation may be used. Such an acidic aqueous solution can be prepared by appropriately combining the types and contained amounts of compounds corresponding to the anions and the cations mentioned above, or can be obtained by using commercially available ones as they are. The pH of the chemical conversion treatment liquid mentioned above is not particularly limited, but is preferably 1.0 to 5.0 and more preferably 2.0 to 4.0.

The temperature during chemical conversion treatment of the chemical conversion treatment liquid in the case of forming a chemical conversion treatment covering film containing an amorphous phosphate or other chemical conversion treatment covering films is not particularly limited, but is preferably 10° C. to 100° C., more preferably 15° C. to 80° C., and still more preferably 20° C. to 60° C. The time of chemical conversion treatment is not particularly limited, and may be selected in accordance with the target attached amount of the chemical conversion treatment covering film to be formed, as appropriate.

Next, coating treatment is performed on the resin coating film of the molded material that has undergone chemical conversion treatment. Thereby, a coating treatment film is formed on the resin coating film that has undergone chemical conversion treatment. A known coating treatment such as electrodeposition coating, powder coating, or solvent coating is used as the coating treatment. In the case where the coating treatment film is composed of a plurality of layers, the coating treatment film can be formed by performing coating treatment multiple times.

The coated member according to the first embodiment can be produced through these steps.

II. Second Embodiment

Next, a surface-treated metal sheet according to a second embodiment is described.

<Surface-Treated Metal Sheet>

The surface-treated metal sheet according to the second embodiment includes a metal sheet and a coating film placed on at least one major surface of the metal sheet, in which the coating film contains oxide particles, a binder resin, and electrically conductive particles, the amount of the electrically conductive particles contained is 5 to 30 mass % relative to the coating film, the oxide particles include at least doped oxide particles, the doped oxide particles include at least one kind selected from the group consisting of doped zinc oxide particles and doped tin oxide particles, the amount of the oxide particles contained is 1 to 30 mass % relative to the coating film, and the amount of the coating film attached to the major surface is 2 to 20 $g/m^2$.

The surface-treated metal sheet according to the second embodiment is excellent in both the adhesiveness to a coating treatment film after coating and weldability by virtue of the configuration mentioned above. The reason is presumed to be as follows.

As described above, on the resin coating film of the surface-treated metal sheet, chemical conversion treatment is generally performed before coating is performed, and a chemical conversion treatment covering film is formed. A typical example of the chemical conversion treatment covering film is an oxychloride covering film such as a phosphate covering film, and the chemical conversion treatment liquid for forming the oxychloride covering film such as a phosphate covering film exhibits acidity (e.g., a pH of 2 to 3).

When the prescribed contained amount mentioned above of doped oxide particles described above are put in the resin coating film of the surface-treated metal sheet, the doped oxide particles are present in a state where some of them are exposed on the surface of the resin coating film and others are dispersed in the interior of the outer layer of the resin coating film (see FIG. 1A). The doped oxide particles described above have the property of being dissolved in an acidic solution (e.g., a pH of 2 to 3), similarly to the non-doped oxide particles described above.

Hence, when chemical conversion treatment with an acidic chemical conversion treatment liquid is performed on the resin coating film containing doped oxide particles, the doped oxide particles exposed on the surface of the resin coating film are dissolved by the acidic chemical conversion treatment liquid. Then, the pH of their vicinity increases, and components of the chemical conversion treatment liquid (e.g., an oxychloride such as a phosphate) deposit and grow. Thereby, a chemical conversion treatment covering film is formed. It is presumed that at this time also the doped oxide particles existing in the interior of the outer layer of the resin coating film are dissolved by the acidic chemical conversion treatment liquid, and components of the chemical conversion treatment liquid enter the interior of the outer layer of the resin coating film and deposit, and grow in a wedge form so as to protrude from the interior to the surface of the outer layer of the resin coating film (see FIG. 1B). When a coating treatment film based on coating is formed on the chemical conversion treatment covering film in this state (see FIG. 1C), the adhesiveness between the resin coating film and the coating treatment film (in particular, the secondary adhesiveness after a warm salt water test) is further enhanced by, in addition to the high adhesiveness by the chemical conversion treatment covering film itself, the anchor effect by a crystal of the chemical conversion treatment covering film that has grown in a wedge form (e.g., a crystal of an oxychloride such as a phosphate).

Here, the presence or absence of a crystal of the chemical conversion treatment covering film (e.g., a crystal of an oxychloride such as a phosphate) can be checked by surface observation with a scanning electron microscope (SEM) or from diffraction peaks obtained by X-ray diffraction analysis.

In addition, the doped oxide particles have electrical conductivity; thus, by putting in doped oxide particles in the range mentioned above, not only the adhesiveness between the resin coating film and the coating treatment film but also the electrical conductivity of the resin coating film is increased, and also weldability is improved.

The effects of the adhesiveness between the resin coating film and the coating treatment film and weldability by the doped oxide particles are improved by setting the attached amount of the resin coating film in the range mentioned above. Furthermore, by putting electrically conductive particles in the range mentioned above in the resin coating film, electrical conductivity is increased, and also excellent weldability is obtained.

From the above, it is presumed that the surface-treated metal sheet according to the second embodiment is excellent in both the adhesiveness to a coating treatment film after coating and weldability by virtue of the configuration mentioned above.

In the second embodiment, in FIG. 1, 10 represents the resin coating film, 12 represents the doped oxide particle, 14 represents the crystal of the chemical conversion treatment covering film (e.g., a crystal of an oxychloride such as a phosphate), and 16 represents the coating treatment film.

In the surface-treated metal sheet according to the second embodiment, anti-corrosive particles may be contained in the resin coating film. The anti-corrosive particles, depending on its type, are dissolved by an acidic chemical conversion treatment liquid. However, when oxide particles are put in the resin coating film along with the anti-corrosive particles, the oxide particles are actively dissolved by the acidic chemical conversion treatment liquid, and accordingly the anti-corrosive particles are dissolved less easily. Thereby, corrosion resistance is easily improved.

In the surface-treated metal sheet according to the second embodiment, the resin coating film may be formed on both surfaces (both major surfaces) of the metal sheet, or may be formed only on one surface (one major surface) of the metal sheet, in accordance with the use. The resin coating film may be formed on part of the surface of the metal sheet, or the entire surface of the metal sheet may be covered. The part of the metal sheet where the resin coating film is formed is excellent in the adhesiveness to a coating treatment film and resistance weldability. The part is excellent also in corrosion resistance and moldability.

The surface-treated metal sheet according to the second embodiment will now be described in detail. However, the surface-treated metal sheet according to the second embodiment has the same configuration as the surface-treated metal sheet according to the first embodiment except that, in place of the prescribed non-doped oxide particles mentioned above, doped oxide particles are contained in the resin coating film. Hence, a description of the same configuration is omitted.

(Oxide Particles)

In the present embodiment, the oxide particles include doped oxide particles.

The oxide particles to be doped include at least one kind selected from the group consisting of zinc oxide particles and tin oxide particles.

The doped oxide particles may be, in the case of doped zinc oxide as an example, a particle in which an oxide particle is doped with at least one element selected from the group consisting of the group 13 elements of the periodic table and the group 15 elements of the periodic table (hereinafter, occasionally referred to as a "dopant element") and is thereby provided with electrical conductivity.

Examples of the group 13 element of the periodic table include B, Al, Ga, In, etc. Examples of the group 15 element of the periodic table include P, As, etc. Among these, Al, Ga, and Sb are preferable as the dopant element in terms of improving electrical conductivity. For zinc oxide, Al is more preferable from the viewpoint of cost.

For tin oxide, antimony-doped tin oxide (ATO), phosphorus-doped tin oxide (PTO), niobium-doped tin oxide (NbTO), tantalum-doped tin oxide (TaTO), fluorine-doped tin oxide (FTO), and the like are given.

The amount of the dopant element contained is preferably 0.05 to 5 atomic % and more preferably 0.1 to 5 atomic % relative to the undoped oxide particle in terms of improving electrical conductivity.

The doped oxide particles, after dissolved by the chemical conversion treatment liquid, promote the growth of the crystal of the chemical conversion treatment covering film (e.g., a crystal of an oxychloride such as a phosphate); therefore, the adhesiveness between the resin coating film and the coating treatment film can be further improved by the anchor effect of the crystal of the chemical conversion treatment covering film.

The doped oxide particles, after dissolved by the chemical conversion treatment liquid, are incorporated into the chemical conversion treatment covering film.

Furthermore, in addition to the improvement in corrosion resistance in association with the chemical conversion treatment formation mentioned above, the doped oxide particles have electrical conductivity, and can therefore act also as an electrically conductive pigment; thus, electrical conductivity can be improved.

The average particle diameter of the doped oxide particles is preferably 0.2 to 5 µm, more preferably 0.3 to 4 µm, and still more preferably 0.4 to 2.5 µm. When the average particle diameter of the doped oxide particles is set to 0.2 to 5 µm, the crystal of the chemical conversion treatment covering film to be formed (e.g., a crystal of an oxychloride such as a phosphate) is likely to grow in a wedge form, and the adhesiveness between the resin coating film and the coating treatment film can be further improved by the anchor effect of the crystal of the chemical conversion treatment covering film.

The "average particle diameter" of the doped oxide particles refers to the average primary particle diameter in the case where the doped oxide particles existing in the resin coating film are present singly, and refers to the average secondary particle diameter that indicates the particle diameter of the doped oxide particle in cohesion in the case where doped oxide particles are present in cohesion; and is preferably found by the following measurement method. First, the surface-treated metal sheet on which the resin coating film is formed is cut to expose a cross section thereof, and the cross section is polished. The cross section thus obtained is observed with an electron microscope, and an observation image of the cross section in the resin coating film is obtained. Several doped oxide particles are selected from those present in the visual field of the observation image, the length of the long side and the length of the short side of each oxide particle are measured, the average value of the lengths of the long sides and the average value of the lengths of the short sides are calculated, and these calculated values are further averaged; thus, the average particle diameter is calculated.

The numerical value of the average particle diameter varies a little with the measurement method. For example, it may vary with the measurement principle in the case of using a particle size distribution meter, and with the image processing method in the case of image analysis. However, the range of the particle diameter of the doped oxide particle prescribed in the present specification is one taking such variations into account, and the expected effect is stably obtained by a particle diameter obtained by any method, provided that the particle diameter is in the range prescribed in the present specification.

Also in the surface-treated metal sheet according to the second embodiment, the resin coating film may contain "at least one kind of oxide particles selected from the group consisting of zinc oxide particles, magnesium oxide particles, calcium oxide particles, tin oxide particles, and strontium oxide particles" in the resin coating film of the surface-treated metal sheet according to the first embodiment.

The amount of oxide particles contained is 1 to 30 mass % relative to the resin coating film (the total solid content of the coating film).

When the amount of oxide particles contained is less than 1 mass %, the component crystal of the chemical conversion treatment covering film to be formed (e.g., a crystal of an oxychloride such as a phosphate) is less likely to be formed in the interior of the outer layer of the resin coating film, and consequently it is difficult to obtain the adhesiveness between the resin coating film and the coating treatment film by the anchor effect of the chemical conversion treatment covering film. Furthermore, also weldability is difficult to obtain. On the other hand, when the amount of oxide particles contained is more than 30 mass %, the formation of the component crystal of the chemical conversion treatment covering film to be formed may reach a maximum, and accordingly the adhesiveness between the resin coating film and the coating treatment film may reach a maximum; and the ratios of the electrically conductive particles and the anti-corrosive particles in the coating film are reduced, and consequently the properties of corrosion resistance before coating etc. may be insufficient.

The amount of oxide particles contained is preferably 10 to 20 mass % in terms of further improving the adhesiveness between the resin coating film and the coating treatment film by the anchor effect of the crystal of the chemical conversion treatment covering film and further improving weldability.

In the case where the resin coating film contains non-doped oxide particles, the amount of non-doped oxide particles contained is preferably 1 to 10 mass % (more preferably 2.5 to 7.5 mass %) relative to the resin coating film in terms of improving the adhesiveness to a coating treatment film after coating and weldability.

(Anti-Corrosive Particles)

The resin coating film preferably contains anti-corrosive particles. The anti-corrosive particles can improve the corrosion resistance of particularly the surface of the metal sheet adjacent to the resin coating film of the surface-treated metal sheet.

The anti-corrosive particles that can be contained in the resin coating film is not particularly limited, but preferably contains at least one selected from the group consisting of aluminum tripolyphosphate, Zn, Mg, Al, Ti, Zr, and Ce salts of phosphoric acid and phosphorous acid, hydrocalumite-treated phosphoric acid compounds (as an example, EXPERT NP-530 N5 produced by Toho Ganryo Kogyo Co., Ltd., which is hydrocalumite-treated zinc phosphate), Ca ion exchange silica, and amorphous silica with an oil absorption of 100 to 1000 ml/100 g, a specific surface area of 200 to 1000 $m^2$/g, and an average particle diameter of 2 to 30 µm.

A preferred anti-corrosive particles are, among these, a phosphate-based anti-corrosive particles (aluminum tripolyphosphate, a hydrocalumite-treated phosphoric acid compound, etc.) or a silica-based anti-corrosive particles, or a combination of both from the viewpoint of achieving the corrosion resistance of both the flawed portion and the flat surface portion. In particular, a preferred anti-corrosive particles are at least one selected from the group consisting of aluminum tripolyphosphate, a hydrocalumite-treated phosphoric acid compound, Ca exchange silica, and amorphous silica with an oil absorption of 100 to 1000 ml/100 g, a specific surface area of 200 to 1000 $m^2$/g, and an average particle diameter of 2 to 30 µm.

In the case where the resin coating film contains doped or non-doped zinc oxide particles, the resin coating film preferably contains, as anti-corrosive particles, aluminum dihydrogen tripolyphosphate containing Mg. Examples of the aluminum dihydrogen tripolyphosphate containing Mg include magnesium-treated aluminum dihydrogen tripolyphosphate, a mixture of aluminum tripolyphosphate and magnesium hydroxide, and the like. It is presumed that, by aluminum dihydrogen tripolyphosphate containing Mg being contained in the resin coating film, zinc oxide, Mg, and aluminum dihydrogen tripolyphosphate react together to form a composite oxide and a composite compound of Zn—Mg and a Zn-phosphoric acid compound, and thereby excellent corrosion resistance is provided.

<Coated Member and Method for Producing Coated Member>

A coated member according to the second embodiment includes a molded material using the surface-treated metal sheet according to the second embodiment mentioned above as the material, a chemical conversion treatment covering film located on the coating film of the molded material, and a coating treatment film located on the chemical conversion treatment covering film.

That is, the coated member according to the second embodiment has the same configuration as the coated member according to the first embodiment except that, in place of the surface-treated metal sheet according to the first embodiment, the surface-treated substrate according to the second embodiment is used. Hence, a description of the coated member according to the second embodiment is omitted.

Also the method for producing the coated member according to the second embodiment has the same construction as the method for producing the coated member according to the first embodiment except that, in place of the surface-treated metal sheet according to the second embodiment, the surface-treated substrate according to the second embodiment is used. Hence, also a description of the method for producing the coated member according to the second embodiment is omitted.

EXAMPLES

The present invention will now be described still more specifically using Examples. However, these Examples do not limit the present invention.

First Example: Example of Surface-Treated Metal Sheet According to First Embodiment

[Production of Surface-Treated Metal Sheet]
1. Preparation of Metal Sheet

The following four types of zinc-based plated steel sheets and an Al sheet were prepared; each of the sheets was dipped in an aqueous solution at 40° C. of 2.5 mass % of a water-based alkaline degreasing agent (FC-301, produced by Nihon Parkerizing Co., Ltd.) for 2 minutes to degrease the surface, and then water washing and drying were performed; thus, metal sheets for coating were obtained.

EG: a zinc-electroplated steel sheet (sheet thickness: 0.8 mm; the amount of plating attached: 40 g/m$^2$)
  ZL: a Zn-10 mass % Ni alloy-electroplated steel sheet (sheet thickness: 0.8 mm; the amount of plating attached: 40 g/m$^2$)
  GI: a zinc-hot-dipped steel sheet (sheet thickness: 0.8 mm; the amount of plating attached: 60 g/m$^2$)
  GA: an alloyed zinc-hot-dipped steel sheet (sheet thickness: 0.8 mm; 10 mass % Fe; the amount of plating attached: 45 g/m$^2$)
  AL: a 6000-series Al sheet (sheet thickness: 1.0 mm)

2. Formation of Underlayer Treatment Covering Film

Next, the following two types of compositions for underlayer treatment covering formation were prepared; each of the compositions was applied to the metal sheet by bar coating so that the covering thickness might be 0.08 μm, and the test piece was dried by air drying in a hot-air oven at a metal surface peak temperature of 70° C.; thus, an underlayer treatment covering film was formed on the surface of the metal sheet.

p1: a water-based coating composition composed of a Zr compound, a silane coupling agent, and silica fine particles
  p2: a water-based coating composition composed of a polyester resin, silica fine particles, and a silane coupling agent 3. Formation of Resin Coating Film Next, in order to form each of the resin coating films of the compositions shown in Table 1 and Table 2, the components were mixed together so as to obtain solid content concentrations close to those of Table 1 and Table 2, and thus a water-based composition for resin coating formation was prepared. The resulting water-based composition was applied onto the metal sheet with a bar coater in accordance with Table 3 to Table 5, and was dried using an oven under conditions for keeping a maximum peak temperature of 140° C. for 8 seconds; thus, a resin coating film was formed. The amount of the resin coating film attached was adjusted by the dilution of the water-based composition and the count of the bar coater so that the total attached amount of the solid content (nonvolatile content) in the water-based composition might be the numerical value shown in Table 3 to Table 5.

In Table 1 and Table 2, the solid content concentration of each component is written as the ratio (unit:mass %; the value per one surface) of the solid content (nonvolatile content) of each component to the solid content (nonvolatile content) of the entire water-based composition.

Details of the components (symbols) in Table 1 and Table 2 are as follows.

(A) Electrically conductive particles
  VC: vanadium carbide (average particle diameter: 1 to 3 μm)
  ZS: zirconium disilicide particles (average particle diameter: 1 to 3 μm)
  ZN: zirconium nitride particles (average particle diameter: 1 to 3 μm)
  TN: titanium nitride particles (average particle diameter: 1 to 3 μm)
  FeV: ferrovanadium particles (average particle diameter: 3 to 7 μm)
  FeSi: ferrosilicon particles (average particle diameter: 3 to 7 μm)
  SUS: SUS particles (average particle diameter: 3 to 7 μm)

(B) Anti-corrosive particles
  PA: aluminum dihydrogen tripolyphosphate (average particle diameter: 1 to 2 μm) (K-WHITE K105, produced by Tayca Corporation)
  PAM: Mg-containing aluminum dihydrogen tripolyphosphate (average particle diameter: 1 to 2 μm) (K-WHITE G105, produced by Tayca Corporation)
  PM: magnesium phosphate (average particle diameter: 1 to 2 μm)
  SC: calcium ion exchange silica (average particle diameter: 1 to 2 μm)
  Si: silica (amorphous silica with an oil absorption of 100 to 1000 ml/100 g, a specific surface area of 200 to 1000 m$^2$/g, and an average particle diameter of 1 to 30 μm) (Sylomask 02, produced by Fuji Silysia Chemical Ltd.)
  HP: hydrocalumite-treated zinc phosphate (EXPERT NP-530 N5, produced by Toho Ganryo Kogyo Co., Ltd.) (average particle diameter: 1 to 2 μm)

(C) Binder resin
  U: a urethane-based resin emulsion (Superflex (registered trademark) E-2000, produced by DKS Co. Ltd.)
  P: a polyester-based resin emulsion (Vylonal (registered trademark) MD1985, produced by Toyobo Co., Ltd.)

(D) Oxide particles

MgO: magnesium oxide particles (average particle diameter: 1.0 µm)

CaO: calcium oxide particles (average particle diameter: 1.0 µm)

ZnO1: zinc oxide particles (electrically non-conductive (non-doped); average particle diameter: 1.0 µm)

SnO1: tin oxide particles (non-doped; average particle diameter: 1.0 µm)

SrO: strontium oxide particles (average particle diameter: 1.0 µm)

M1: magnesium oxide particles (average particle diameter: 0.5 µm)

M2: magnesium oxide particles (average particle diameter: 2.0 µm)

M3: magnesium oxide particles (average particle diameter: 5.0 µm)

M4: magnesium oxide particles (average particle diameter: 10.0 µm)

For each kind of oxide particles mentioned above, the oxide particles were dispersed in water in which the resin had been added, and pulverization was performed with a ball mill; and the resulting material was used. For the average particle diameter of the oxide particles, the pulverization time was adjusted, and the average particle diameter in the resin coating film was measured. All of the oxide particles mentioned above are non-doped oxide particles.

(E) Other additives

Wax: polyethylene wax

ZrO: zirconia particles (zirconia sol NanoUse ZR-30AL, produced by Nissan Chemical Industries, Ltd.)

T: titania (titanium oxide R-930, produced by Ishihara Sangyo Kaisha, Ltd.)

CS: colloidal silica (silica sol ST-O, produced by Nissan Chemical Industries, Ltd.)

5. Production of Surface-Treated Metal Sheet

The underlayer treatment covering film and the resin coating film were formed on the metal sheet in accordance with the description of Table 1 to Table 5 and the operating methods mentioned above; thus, a surface-treated metal sheet of each sample number was produced.

[Chemical Conversion Treatability Evaluation Test]

The surface-treated metal sheet of each sample number was press-molded. The resulting molded material was subjected to surface conditioning at room temperature for 20 seconds using a surface conditioning treatment agent, Prepalene X (product name) produced by Nihon Parkerizing Co., Ltd. Further, chemical conversion treatment (phosphate treatment) was performed using a chemical conversion treatment liquid (zinc phosphate treatment liquid), "Palbond 3020 (product name)" produced by Nihon Parkerizing Co., Ltd. The molded material was dipped in the chemical conversion treatment liquid for 120 seconds, with the temperature of the chemical conversion treatment liquid set to 43° C., and then water washing and drying were performed.

Random 5 visual fields (125 µm×90 µm) of the surface of the molded material after chemical conversion treatment (phosphate treatment) were observed with a scanning electron microscope (SEM) at a magnification of 1000 times, and back scattered electron images (BSE images) were obtained. In the back scattered electron image, the observation area was displayed as an image by the gray scale. In the back scattered electron image, the contrast is different between a portion where a phosphate covering film that is a chemical conversion treatment covering film is formed and a portion where a phosphate covering film is not formed. Thus, the numerical range X1 of the lightness (a plurality of levels of gradation) of a portion where a phosphate covering film was not formed was determined in advance by a SEM and an energy dispersive X-ray spectrometer (EDS).

In the back scattered electron image of each visual field, the area A1 of an area showing the contrast of the numerical range X1 was found by image processing. Then, the transparent area ratio TR (%) of each visual field was found on the basis of the following formula.

$$TR = (A1/A0) \times 100 \quad \text{Formula:}$$

Here, in Formula (1) above, A0 represents the total area of the visual field (11,250 µm²). The average of the transparent area ratios TR (%) of the 5 visual fields was defined as the transparent area ratio (%) of the steel material of the sample.

"C" of the "Chemical conversion treatability" section in Table 3 to Table 5 means that the transparent area ratio was 15% or more. "B" means that the transparent area ratio was not less than 5% and less than 15%. "A" means that the transparent area ratio was less than 5%. The case of "B" or "A" in the transparency evaluation was assessed as excellent in chemical conversion treatability (phosphate treatability).

[Electrodeposition Coating Treatment Film Adhesiveness Evaluation Test]

After the chemical conversion treatment (phosphate treatment) mentioned above was performed, the surface-treated metal sheet was coated with a cationic electrodeposition coating material produced by Nippon Paint Co., Ltd. by electrodeposition with slope energization at a voltage of 160 V, and baking coating was performed at a baking temperature of 170° C. for 20 minutes. The average of film thicknesses of the coating treatment film after electrodeposition coating was 10 µm in all the samples.

After the electrodeposition coating was performed, 100 one-millimeter grid squares were provided to the coating treatment film of the surface-treated metal sheet with a cutter (load: 500 gf; 1 gf being approximately $9.8 \times 10^{-3}$ N), and a polyester tape was adhered to the grid squares. After that, the tape was ripped off. The number of grid squares peeled off by the ripping-off of the tape was found, and the rate of peeling of the coating treatment film (%) was found on the basis of the following formula.

$$\text{Rate of peeling of the coating treatment film} = (\text{the number of grid squares peeled off}/100) \times 100 \quad \text{Formula:}$$

"D" of the "Electrodeposition coating treatment film adhesiveness" section in Table 3 to Table 5 means that the rate of peeling of the coating treatment film was 10.0% or more. "C" means that it was not less than 5.0% and less than 10.0%. "B" means that the rate of peeling of the coating treatment film was not less than 1.0% and less than 5.0%. "A" means that the rate of peeling of the coating treatment film was less than 1.0%. The case of "B" or "A" in the electrodeposition coating treatment film adhesiveness evaluation was assessed as excellent in electrodeposition coating treatment film adhesiveness.

[SDT Resistance Evaluation Test]

After the electrodeposition coating mentioned above, the surface-treated metal sheet was dipped in a 5% NaCl aqueous solution having a temperature of 50° C. for 500 hours. After the dipping, a polyester tape was adhered to the whole of an area of 60 mm×120 mm (area A10=60 mm×120 mm=7200 mm²) of the test surface. After that, the tape was ripped off. The area A2 (mm²) of the coating treatment film peeled off by the ripping-off of the tape was found, and the rate of peeling of the coating treatment film (%) was found on the basis of the following formula.

$$\text{Rate of peeling of the coating treatment film} = (A2/A10) \times 100 \quad \text{Formula:}$$

"D" of the "SDT resistance" section in Table 3 to Table 5 means that the rate of peeling of the coating treatment film was 30.0% or more. "C" means that it was not less than 10.0% and less than 30.0%. "B" means that the rate of peeling of the coating treatment film was not less than 5.0% and less than 10.0%. "A" means that the rate of peeling of the coating treatment film was less than 5.0%. The case of "B" or "A" in the SDT resistance evaluation was assessed as excellent in SDT resistance.

[Weldability Test]

The surface-treated metal sheet before performing the chemical conversion treatment (phosphate treatment) mentioned above was subjected to a consecutive spot weldability test, using CF type Cr—Cu electrodes having a tip with a diameter of 5 mm and a curvature radius of 40 mm, at an applied pressure of 1.96 kN, a welding current of 8 kA, and an energization time of 12 cycles/50 Hz; and the number of welds at the time immediately before the nugget diameter became less than $3\sqrt{t}$ (t being the sheet thickness) was found. The superiority or inferiority of spot weldability was evaluated using the following evaluation points.

A: the number of welds was 1000 or more
B: not less than 200 and less than 1000
C: less than 200
D: no nugget was generated and no spot was able to be welded The case of "B" or "A" in the weldability test was assessed as excellent in weldability.

[Cycle Corrosion Property (Corrosion Resistance) Test]

After the electrodeposition coating mentioned above was performed, a gap was provided to the coating treatment film of the surface-treated metal sheet with a cutter (load: 500 gf; 1 gf being approximately $9.8 \times 10^{-3}$ N), and a cycle corrosion test of the following cycle conditions was performed 180 cycles.

—Cycle Conditions—

A cycle corrosion test was performed in which a procedure of 2 hr of salt water spraying (SST; 5% NaCl; atmosphere: 35° C.), 2 hr of drying (60° C.), and 4 hr of wetting (50° C.; RH: 98%) was taken as 1 cycle.

After that, the presence or absence of a blister of the coating film occurring in an area of approximately 1 cm width from the cut portion was observed.

"E" of the "Cycle corrosion property (corrosion resistance) test" section in Table 3 to Table 5 means that a coating blister of more than 3 mm occurred. "D" means that a coating blister of not less than 1.5 mm and less than 3 mm occurred. "C" means that a coating blister of not less than 1 mm and less than 1.5 mm occurred. "B" means that a minute coating blister of less than 1 mm occurred. "A" means that no coating blister occurred. The case of "C," "B," or "A" in the cycle corrosion property (corrosion resistance) test was assessed as excellent in cycle corrosion property (corrosion resistance).

[Powder Coating Treatment Film Adhesiveness Evaluation Test]

After the chemical conversion treatment (phosphate treatment) mentioned above was performed, the surface-treated metal sheet was electrostatically coated with a polyester-based resin coating material (a powder polyester coating material "Powdax," produced by Nippon Paint Co., Ltd.), and baking coating was performed at a baking temperature of 180° C. for 20 minutes. The average of film thicknesses of the coating treatment film after powder coating was 50 μm in all the samples.

After the powder coating, the surface-treated metal sheet was dipped in a 5% NaCl aqueous solution having a temperature of 50° C. for 500 hours. After the dipping, a polyester tape was adhered to the whole of an area of 60 mm×120 mm (area A10=60 mm×120 mm=7200 mm²) of the test surface. After that, the tape was ripped off. The area A2 (mm²) of the coating treatment film peeled off by the ripping-off of the tape was found, and the rate of peeling of the coating treatment film (%) was found on the basis of the following formula.

Rate of peeling of the coating treatment film=$(A2/A10) \times 100$   Formula:

The powder coating treatment film adhesiveness evaluation test was performed on sample Nos. 1 to 3 of the surface-treated metal sheet.

"D" of the "Powder coating treatment film adhesiveness" section in Table 3 to Table 5 means that the rate of peeling of the coating treatment film was 30.0% or more. "C" means that it was not less than 10.0% and less than 30%. "B" means that the rate of peeling of the coating treatment film was not less than 5.0% and less than 10.0%. "A" means that the rate of peeling of the coating treatment film was less than 5.0%. The case of "B" or "A" in the powder coating treatment film adhesiveness evaluation was assessed as excellent in powder coating treatment film adhesiveness.

Details of First Example are collectively shown in Table 1 to Table 5 below. The sample of which the "Notes" section of Table 3 to Table 5 is a blank falls under Example.

TABLE 1

| Water-based composition No. | (A) Electrically conductive particles (Non-oxide ceramic particles) | | Electrically conductive particles (others) | | (B) Anti-corrosive particles | | (C) Binder resin | | (D) Oxide particles | | (E) Other additives | |
|---|---|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) | Type | Concentration (mass %) |
| 1 | TN | 10 | FeV | 10 | Si | 30 | U | 45 | MgO | 5 | | |
| 2 | TN | 10 | FeV | 10 | Si | 30 | U | 47.5 | MgO | 2.5 | | |
| 3 | TN | 10 | FeV | 10 | Si | 30 | U | 42.5 | MgO | 7.5 | | |
| 4 | TN | 10 | FeV | 10 | Si | 30 | U | 49 | MgO | 1 | | |
| 5 | TN | 10 | FeV | 10 | Si | 30 | U | 40 | MgO | 10 | | |
| 6 | TN | 10 | FeV | 10 | Si | 30 | U | 49.5 | MgO | 0.5 | | |

TABLE 1-continued

| Water-based composition No. | (A) Electrically conductive particles (Non-oxide ceramic particles) | | Electrically conductive particles (others) | | (B) Anti-corrosive particles | | (C) Binder resin | | (D) Oxide particles | | (E) Other additives | |
|---|---|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) | Type | Concentration (mass %) |
| 7 | TN | 10 | FeV | 10 | Si | 30 | U | 35 | MgO | 15 | | |
| 8 | TN | 20 | | | Si | 30 | U | 45 | MgO | 5 | | |
| 9 | ZS | 20 | | | Si | 30 | U | 45 | MgO | 5 | | |
| 10 | ZN | 20 | | | Si | 30 | U | 45 | MgO | 5 | | |
| 11 | VC | 20 | | | Si | 30 | U | 45 | MgO | 5 | | |
| 12 | | | FeV | 20 | Si | 30 | U | 45 | MgO | 5 | | |
| 13 | | | FeSi | 20 | Si | 30 | U | 45 | MgO | 5 | | |
| 14 | | | SUS | 20 | Si | 30 | U | 45 | MgO | 5 | | |
| 15 | TN | 10 | FeV | 10 | Si | 30 | U | 45 | CaO | 5 | | |
| 16 | TN | 10 | FeV | 10 | Si | 30 | U | 45 | ZnO1 | 5 | | |
| 17 | TN | 10 | FeV | 10 | Si | 30 | U | 45 | SrO | 5 | | |
| 18 | TN | 1 | FeV | 19 | Si | 30 | U | 45 | MgO | 5 | | |
| 19 | TN | 2 | FeV | 18 | Si | 30 | U | 45 | MgO | 5 | | |
| 20 | TN | 18 | FeV | 2 | Si | 30 | U | 45 | MgO | 5 | | |
| 21 | TN | 16 | FeV | 4 | Si | 30 | U | 45 | MgO | 5 | | |
| 22 | TN | 2.5 | | | Si | 30 | U | 62.5 | MgO | 5 | | |
| 23 | TN | 5 | | | Si | 30 | U | 60 | MgO | 5 | | |
| 24 | TN | 25 | | | Si | 30 | U | 40 | MgO | 5 | | |
| 25 | TN | 30 | | | Si | 30 | U | 35 | MgO | 5 | | |
| 26 | | | FeV | 2.5 | Si | 30 | U | 62.5 | MgO | 5 | | |
| 27 | | | FeV | 5 | Si | 30 | U | 60 | MgO | 5 | | |
| 28 | | | FeV | 25 | Si | 30 | U | 40 | MgO | 5 | | |
| 29 | | | FeV | 30 | Si | 30 | U | 35 | MgO | 5 | | |
| 30 | TN | 1.5 | FeV | 1.5 | Si | 30 | U | 62 | MgO | 5 | | |

TABLE 2

| Water-based composition No. | (A) Electrically conductive particles (Non-oxide ceramic particles) | | Electrically conductive particles (others) | | (B) Anti-corrosive particles | | (C) Binder resin | | (D) Oxide particles | | (E) Other additives | |
|---|---|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) | Type | Concentration (mass %) |
| 31 | TN | 2.5 | FeV | 2.5 | Si | 30 | U | 60 | MgO | 5 | | |
| 32 | TN | 12.5 | FeV | 12.5 | Si | 30 | U | 40 | MgO | 5 | | |
| 33 | TN | 15 | FeV | 15 | Si | 30 | U | 35 | MgO | 5 | | |
| 34 | TN | 10 | FeV | 10 | Si | 30 | U | 45 | M1 | 5 | | |
| 35 | TN | 10 | FeV | 10 | Si | 30 | U | 45 | M2 | 5 | | |
| 36 | TN | 10 | FeV | 10 | Si | 30 | U | 45 | M3 | 5 | | |
| 37 | TN | 10 | FeV | 10 | Si | 30 | U | 45 | M4 | 5 | | |
| 38 | TN | 10 | FeV | 5 | Si | 30 | U | 45 | MgO | 5 | | |
| | | | SUS | 5 | | | | | | | | |
| 39 | TN | 10 | FeV | 10 | Si | 30 | U | 43 | MgO | 5 | wax | 2 |
| 40 | TN | 10 | FeV | 10 | Si | 30 | U | 40 | MgO | 5 | ZrO | 5 |
| 41 | TN | 10 | FeV | 10 | Si | 30 | U | 40 | SrO | 5 | ZrO | 5 |
| 42 | TN | 10 | FeV | 10 | Si | 30 | U | 40 | MgO | 5 | T | 5 |
| 43 | TN | 10 | FeV | 10 | Si | 30 | U | 40 | MgO | 5 | CS | 5 |
| 44 | TN | 10 | FeV | 10 | Si | 30 | P | 45 | MgO | 5 | | |
| 45 | TN | 10 | FeV | 10 | PA | 30 | U | 45 | MgO | 5 | | |
| 46 | TN | 10 | FeV | 10 | PM | 30 | U | 45 | MgO | 5 | | |
| 47 | TN | 10 | FeV | 10 | SC | 30 | U | 45 | MgO | 5 | | |
| 48 | TN | 10 | FeV | 10 | HP | 30 | U | 45 | MgO | 5 | | |
| 49 | TN | 10 | FeV | 10 | | | U | 75 | MgO | 5 | | |
| 50 | TN | 10 | FeV | 10 | Si | 30 | U | 45 | SnO1 | 5 | | |
| 51 | TN | 10 | FeV | 10 | Si | 30 | U | 40 | SnO2 | 5 | ZrO | 5 |
| 52 | TN | 20 | | | PA | 30 | U | 45 | ZnO1 | 5 | | |

TABLE 2-continued

| | (A) Electrically conductive particles (Non-oxide ceramic particles) | | Electrically conductive particles (others) | | (B) Anti-corrosive particles | | (C) Binder resin | | (D) Oxide particles | | (E) Other additives | |
|---|---|---|---|---|---|---|---|---|---|---|---|---|
| Water-based composition No. | Type | Concentration (mass %) | Type | Concentration (mass %) | Type | Concentration (mass %) | Type | Concentration (mass %) | Type | Concentration (mass %) | Type | Concentration (mass %) |
| 53 | TN | 20 | | | PA  | 10 | U | 65 | ZnO1 | 5 | | |
| 54 | TN | 20 | | | PA  |  5 | U | 70 | ZnO1 | 5 | | |
| 55 | TN | 20 | | | PAM | 30 | U | 45 | ZnO1 | 5 | | |
| 56 | TN | 20 | | | PAM | 10 | U | 65 | ZnO1 | 5 | | |
| 57 | TN | 20 | | | PAM |  5 | U | 70 | ZnO1 | 5 | | |
| 58 | TN | 20 | | | PAM |  1 | U | 74 | ZnO1 | 5 | | |

TABLE 3

| | | | Resin coating film | | Tests | | | | | | |
|---|---|---|---|---|---|---|---|---|---|---|---|
| Sample No. | Metal sheet Type | Underlayer treatment covering film Type | Type of water-based composition | Attached amount (g/m$^2$) | Chemical conversion treatability | Electro-deposition coating treatment film adhesiveness | SDT resistance | Weldability | Corrosion resistance | Powder coating treatment film adhesiveness | Notes |
| 1  | GA | | 1  | 3 | A | A | A | A | A | A | |
| 2  | GA | | 2  | 3 | A | A | A | A | A | A | |
| 3  | GA | | 3  | 3 | A | A | A | A | A | A | |
| 4  | GA | | 4  | 3 | B | A | B | A | A | | |
| 5  | GA | | 5  | 3 | A | A | B | A | A | | |
| 6  | GA | | 6  | 3 | C | A | C | A | A | | Comparative Example |
| 7  | GA | | 7  | 3 | A | C | C | A | A | | Comparative Example |
| 8  | GA | | 8  | 3 | A | A | A | B | B | | |
| 9  | GA | | 9  | 3 | A | A | A | B | B | | |
| 10 | GA | | 10 | 3 | A | A | A | B | B | | |
| 11 | GA | | 11 | 3 | A | A | A | B | B | | |
| 12 | GA | | 12 | 3 | A | A | A | B | A | | |
| 13 | GA | | 13 | 3 | A | A | A | B | A | | |
| 14 | GA | | 14 | 3 | A | A | A | B | B | | |
| 15 | GA | | 15 | 3 | A | A | A | A | A | | |
| 16 | GA | | 16 | 3 | A | A | A | A | A | | |
| 17 | GA | | 17 | 3 | B | A | B | A | A | | |
| 18 | GA | | 18 | 3 | A | A | A | B | A | | |
| 19 | GA | | 19 | 3 | A | A | A | A | A | | |
| 20 | GA | | 20 | 3 | A | A | A | A | B | | |
| 21 | GA | | 21 | 3 | A | A | A | A | B | | |
| 22 | GA | | 22 | 3 | A | A | A | C | B | | Comparative Example |
| 23 | GA | | 23 | 3 | A | A | A | B | B | | |
| 24 | GA | | 24 | 3 | A | A | A | B | B | | |
| 25 | GA | | 25 | 3 | A | A | B | A | B | | |

TABLE 4

| Sample No. | Metal sheet Type | Underlayer treatment covering film Type | Resin coating film Type of water-based composition | Resin coating film Attached amount (g/m$^2$) | Chemical conversion treatability | Electro-deposition coating treatment film adhesiveness | SDT resistance | Weldability | Corrosion resistance | Powder coating treatment film adhesiveness | Notes |
|---|---|---|---|---|---|---|---|---|---|---|---|
| 26 | GA |  | 26 | 3 | A | A | A | C | B |  | Comparative Example |
| 27 | GA |  | 27 | 3 | A | A | A | B | B |  |  |
| 28 | GA |  | 28 | 3 | A | A | A | B | A |  |  |
| 29 | GA |  | 29 | 3 | A | A | B | A | A |  |  |
| 30 | GA |  | 30 | 3 | A | A | A | C | B |  | Comparative Example |
| 31 | GA |  | 31 | 3 | A | A | A | B | B |  |  |
| 32 | GA |  | 32 | 3 | A | A | A | A | B |  |  |
| 33 | GA |  | 33 | 3 | A | A | B | A | A |  |  |
| 34 | GA |  | 34 | 3 | A | A | A | A | A |  |  |
| 35 | GA |  | 35 | 3 | A | A | A | A | A |  |  |
| 36 | GA |  | 36 | 3 | A | A | B | B | A |  |  |
| 37 | GA |  | 37 | 3 | A | A | B | B | A |  |  |
| 38 | GA |  | 38 | 3 | A | A | A | A | B |  |  |
| 39 | GA |  | 39 | 3 | A | A | A | A | A |  |  |
| 40 | GA |  | 40 | 3 | A | A | A | A | A |  |  |
| 41 | GA |  | 41 | 3 | B | A | A | A | A |  |  |
| 42 | GA |  | 42 | 3 | A | A | A | A | A |  |  |
| 43 | GA |  | 43 | 3 | A | A | A | A | A |  |  |
| 44 | GA |  | 44 | 3 | A | A | A | A | A |  |  |
| 45 | GA |  | 45 | 3 | A | A | A | A | A |  |  |
| 46 | GA |  | 46 | 3 | A | A | A | A | A |  |  |
| 47 | GA |  | 47 | 3 | A | A | A | A | A |  |  |
| 48 | GA |  | 48 | 3 | A | A | A | A | A |  |  |
| 49 | GA |  | 49 | 3 | A | A | A | B | C |  |  |

TABLE 5

| Sample No. | Metal sheet Type | Underlayer treatment covering film Type | Resin coating film Type of water-based composition | Resin coating film Attached amount (g/m$^2$) | Chemical conversion treatability | Electro-deposition coating treatment film adhesiveness | SDT resistance | Weldability | Corrosion resistance | Powder coating treatment film adhesiveness | Notes |
|---|---|---|---|---|---|---|---|---|---|---|---|
| 50 | GA |  | 50 | 3 | A | A | A | A | A |  |  |
| 51 | GA |  | 51 | 3 | A | A | A | A | A |  |  |
| 52 | GA |  | 52 | 3 | A | A | A | A | B |  |  |
| 53 | GA |  | 53 | 3 | A | A | A | A | B |  |  |
| 54 | GA |  | 54 | 3 | A | A | A | A | C |  |  |
| 55 | GA |  | 55 | 3 | A | A | A | A | A |  |  |
| 56 | GA |  | 56 | 3 | A | A | A | A | A |  |  |
| 57 | GA |  | 57 | 3 | A | A | A | A | B |  |  |
| 58 | GA |  | 58 | 3 | A | A | A | A | C |  |  |
| 59 | EG |  | 1 | 3 | A | A | A | A | A |  |  |
| 60 | ZL |  | 1 | 3 | A | A | A | A | A |  |  |
| 61 | GI |  | 1 | 3 | A | A | A | A | A |  |  |
| 62 | AL |  | 1 | 3 | A | A | A | A | A |  |  |
| 63 | GA | p1 | 8 | 3 | A | A | A | B | A |  |  |
| 64 | GA | p2 | 8 | 3 | A | A | A | B | A |  |  |
| 65 | GA | p1 | 1 | 3 | A | A | A | A | A |  |  |
| 66 | GA | p2 | 1 | 3 | A | A | A | A | A |  |  |
| 67 | GA |  | 1 | 1 | A | A | D | A | E |  | Comparative Example |
| 68 | GA |  | 1 | 1.5 | A | A | C | A | D |  | Comparative Example |
| 69 | GA |  | 1 | 2 | A | A | B | A | B |  |  |
| 70 | GA |  | 1 | 5 | A | A | A | A | A |  |  |
| 71 | GA |  | 1 | 10 | A | A | A | A | A |  |  |
| 72 | GA |  | 1 | 15 | A | A | A | B | A |  |  |

TABLE 5-continued

| | | Underlayer | Resin coating film | | | Electro-deposition | | | | Powder | |
| | Metal | treatment | Type of | | | coating | | | | coating | |
| Sample | sheet | covering film | water-based | Attached amount | Chemical conversion | treatment film | SDT | | Corrosion | treatment film | |
| No. | Type | Type | composition | (g/m²) | treatability | adhesiveness | resistance | Weldability | resistance | adhesiveness | Notes |
|---|---|---|---|---|---|---|---|---|---|---|---|
| 73 | GA | | 1 | 20 | A | A | A | B | A | | |
| 74 | GA | | 1 | 25 | A | A | A | C | A | | Comparative Example |

From the above results, it can be seen that sample Nos. 1 to 5, 8 to 21, 23 to 25, 27 to 29, 31 to 66, and 69 to 73 of the surface-treated metal sheet corresponding to Examples are higher in both electrodeposition coating treatment film adhesiveness (the primary adhesiveness) and SDT resistance (the secondary adhesiveness) after coating than sample Nos. 6 and 7 of the surface-treated metal sheet corresponding to Comparative Examples. As shown by sample Nos. 1 to 3 of the surface-treated metal sheet corresponding to Examples, it can be seen that also powder coating treatment film adhesiveness is high. Furthermore, it can be seen that also corrosion resistance is excellent.

It can be seen that sample Nos. 1 to 5, 8 to 21, 23 to 25, 27 to 29, 31 to 66, and 69 to 73 of the surface-treated metal sheet corresponding to Examples are excellent also in weldability as compared to sample Nos. 22, 26, and 30 of the surface-treated metal sheet corresponding to Comparative Examples.

On the other hand, it can be seen that, in sample Nos. 67 and 68 of the surface-treated steel sheet corresponding to Comparative Examples, the amount of the resin coating film attached is too small, and therefore SDT resistance (the secondary adhesiveness) and corrosion resistance are worsened. In can be seen that, in sample No. 74 of the surface-treated steel sheet corresponding to Comparative Example, the amount of the resin coating film attached is too large, and therefore weldability is worsened.

Second Example: Example of Surface-Treated Metal Sheet According to Second Embodiment Surface-treated metal sheets were produced and evaluated in a similar manner to First Example except that the conditions described in Table 6 and the subsequent tables were used. In Table 6, "ZnO2" of the "Oxide particles" section represents electrically conductive zinc oxide particles doped with aluminum, 23-Kt (average particle diameter: 0.5 μm) produced by HakusuiTech Co., Ltd.

Details of Second Example are collectively shown in Table 6 to Table 8 below. The sample of which the "Notes" section of Table 6 to Table 8 is a blank falls under Example.

TABLE 6

| Water-based composition No. | (A) Electrically conductive particles (non-oxide ceramic particles) | | Electrically conductive particles (others) | | (B) Anti-corrosive particles | | (C) Binder resin | | (D) Oxide particles | | (E) Other additives | |
| | Type | Concentration (mass %) | Type | Concentration (mass %) | Type | Concentration (mass %) | Type | Concentration (mass %) | Type | Concentration (mass %) | Type | Concentration (mass %) |
|---|---|---|---|---|---|---|---|---|---|---|---|---|
| 59 | TN | 15 | | | Si | 20 | U | 64.5 | ZnO2 | 0.5 | | |
| 60 | TN | 15 | | | Si | 20 | U | 64 | ZnO2 | 1 | | |
| 61 | TN | 15 | | | Si | 20 | U | 55 | ZnO2 | 10 | | |
| 62 | TN | 15 | | | Si | 20 | U | 50 | ZnO2 | 15 | | |
| 63 | TN | 15 | | | Si | 20 | U | 45 | ZnO2 | 20 | | |
| 64 | TN | 15 | | | Si | 20 | U | 35 | ZnO2 | 30 | | |
| 65 | TN | 15 | | | Si | 20 | U | 25 | ZnO2 | 40 | | |
| 66 | ZS | 15 | | | Si | 20 | U | 50 | ZnO2 | 15 | | |
| 67 | ZN | 15 | | | Si | 20 | U | 50 | ZnO2 | 15 | | |
| 68 | TN | 15 | | | PA | 20 | U | 50 | ZnO2 | 15 | | |
| 69 | TN | 15 | | | PM | 30 | U | 40 | ZnO2 | 15 | | |
| 70 | TN | 15 | | | SC | 30 | U | 40 | ZnO2 | 15 | | |
| 71 | TN | 15 | | | HP | 30 | U | 40 | ZnO2 | 15 | | |
| 72 | TN | 15 | | | Si | 30 | P | 40 | ZnO2 | 15 | | |
| 73 | TN | 5 | | | Si | 20 | U | 74.5 | ZnO2 | 0.5 | | |
| 74 | TN | 5 | | | Si | 20 | U | 65 | ZnO2 | 10 | | |
| 75 | TN | 5 | | | Si | 20 | U | 60 | ZnO2 | 15 | | |
| 76 | TN | 5 | | | Si | 20 | U | 55 | ZnO2 | 20 | | |
| 77 | TN | 15 | | | Si | 20 | U | 50 | SnO2 | 15 | | |
| 78 | TN | 15 | | | Si | 20 | U | 55 | SnO2 | 10 | | |
| 79 | TN | 15 | | | PA | 10 | U | 60 | ZnO2 | 15 | | |
| 80 | TN | 15 | | | PA | 5 | U | 65 | ZnO2 | 15 | | |

TABLE 6-continued

| | (A) Electrically conductive particles (non-oxide ceramic particles) | | Electrically conductive particles (others) | | (B) Anti-corrosive particles | | (C) Binder resin | | (D) Oxide particles | | (E) Other additives | |
|---|---|---|---|---|---|---|---|---|---|---|---|---|
| Water-based composition No. | Type | Concentration (mass %) | Type | Concentration (mass %) | Type | Concentration (mass %) | Type | Concentration (mass %) | Type | Concentration (mass %) | Type | Concentration (mass %) |
| 81 | TN | 15 | | | PAM | 20 | U | 50 | ZnO2 | 15 | | |
| 82 | TN | 15 | | | PAM | 10 | U | 60 | ZnO2 | 15 | | |
| 83 | TN | 15 | | | PAM | 5 | U | 65 | ZnO2 | 15 | | |
| 84 | TN | 15 | | | PAM | 1 | U | 69 | ZnO2 | 15 | | |
| 85 | TN | 10 | FeV | 10 | Si | 30 | U | 45 | ZnO2 | 5 | | |

TABLE 7

| | | | | | Tests | | | | | |
|---|---|---|---|---|---|---|---|---|---|---|
| Sample No. | Metal sheet Type | Underlayer treatment covering film Type | Resin coating film Type of water-based composition | Attached amount | Chemical conversion testability | Electro-deposition coating treatment film adhesiveness | SDT resistance | Weldability | Corrosion resistance | Powder coating treatment film adhesiveness | Notes |
| 75 | GA | | 59 | 3 | C | A | C | A | B | | Comparative Example |
| 76 | GA | | 60 | 3 | B | A | B | A | B | | |
| 77 | GA | | 61 | 3 | A | A | A | A | B | | |
| 78 | GA | | 62 | 3 | A | A | A | A | B | A | |
| 79 | GA | | 63 | 3 | A | A | A | A | B | | |
| 80 | GA | | 64 | 3 | A | B | A | A | B | | |
| 81 | GA | | 65 | 3 | A | C | A | A | B | | Comparative Example |
| 82 | GA | | 66 | 3 | A | A | A | A | B | | |
| 83 | GA | | 67 | 3 | A | A | A | A | B | | |
| 84 | GA | | 68 | 3 | A | A | A | A | B | | |
| 85 | GA | | 69 | 3 | A | A | A | A | B | | |
| 86 | GA | | 70 | 3 | A | A | A | A | B | | |
| 87 | GA | | 71 | 3 | A | A | A | A | B | | |
| 88 | GA | | 72 | 3 | A | A | A | A | B | | |
| 89 | GA | | 73 | 3 | C | A | C | B | B | | Comparative Example |
| 90 | GA | | 74 | 3 | A | A | A | A | B | | |
| 91 | GA | | 75 | 3 | A | A | A | A | B | | |
| 92 | GA | | 76 | 3 | A | A | A | A | B | | |
| 93 | GA | | 77 | 3 | A | A | A | A | B | | |
| 94 | GA | | 78 | 3 | A | A | A | A | B | | |
| 95 | GA | | 79 | 3 | A | A | A | A | B | | |
| 96 | GA | | 80 | 3 | A | A | A | A | A | C | |

TABLE 8

| | | | | | Tests | | | | | |
|---|---|---|---|---|---|---|---|---|---|---|
| Sample No. | Metal sheet Type | Underlayer treatment covering film Type | Resin coating film Type of water-based composition | Attached amount | Chemical conversion treatability | Electro-deposition coating treatment film adhesiveness | SDT resistance | Weldability | Corrosion resistance | Powder coating treatment film adhesiveness | Notes |
| 97 | GA | | 81 | 3 | A | A | A | A | A | | |
| 98 | GA | | 82 | 3 | A | A | A | A | A | | |

TABLE 8-continued

| Sample No. | Metal sheet Type | Underlayer treatment covering film Type | Resin coating film Type of water-based composition | Resin coating film Attached amount | Tests Chemical conversion treatability | Tests Electro-deposition coating treatment film adhesiveness | Tests SDT resistance | Tests Weldability | Tests Corrosion resistance | Tests Powder coating treatment film adhesiveness | Notes |
|---|---|---|---|---|---|---|---|---|---|---|---|
| 99 | GA | | 83 | 3 | A | A | A | A | B | | |
| 100 | GA | | 84 | 3 | A | A | A | A | C | | |
| 101 | GA | | 85 | 3 | A | A | A | A | A | | |
| 102 | EG | | 62 | 3 | A | A | A | A | B | A | |
| 103 | ZL | | 62 | 3 | A | A | A | A | B | A | |
| 104 | GI | | 62 | 3 | A | A | A | A | B | A | |
| 105 | AL | | 62 | 3 | A | A | A | A | B | A | |
| 106 | GA | p1 | 62 | 3 | A | A | A | A | A | | |
| 107 | GA | p2 | 62 | 3 | A | A | A | A | A | | |
| 108 | GA | | 59 | 1 | C | A | C | A | E | | Comparative Example |
| 109 | GA | | 59 | 1.5 | C | A | C | A | D | | Comparative Example |
| 110 | GA | | 62 | 2 | A | A | A | A | B | | |
| 111 | GA | | 62 | 5 | A | A | A | A | B | | |
| 112 | GA | | 62 | 10 | A | A | A | A | A | | |
| 113 | GA | | 62 | 15 | A | A | A | A | A | | |
| 114 | GA | | 62 | 20 | A | B | B | B | A | | |
| 115 | GA | | 62 | 30 | A | C | C | D | A | | Comparative Example |

From the above results, it can be seen that sample Nos. 76 to 80, 82 to 88, 90 to 107, and 110 to 114 of the surface-treated metal sheet corresponding to Examples are higher in both electrodeposition coating treatment film adhesiveness (the primary adhesiveness) and SDT resistance (the secondary adhesiveness) after coating than sample Nos. 76, 82, 90, and 110 of the surface-treated metal sheet corresponding to Comparative Examples. Further, from the comparison between sample Nos. 76 to 80 of the surface-treated metal sheet corresponding to Examples and sample Nos. 75 and 89 of the surface-treated metal sheet corresponding to Comparative Examples, it can be seen that, when oxide particles are used, also weldability is improved.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 resin coating film
12 oxide particle (or doped zinc oxide particle)
14 crystal of chemical conversion treatment covering film (e.g., a crystal of an oxychloride such as a phosphate)
16 coating treatment film

The invention claimed is:
1. A coated member comprising:
a molded material formed from a surface-treated metal sheet as a material, the surface-treated metal sheet comprising:
a metal sheet; and
a coating film placed on at least one major surface of the metal sheet,
wherein the coating film contains oxide particles, a binder resin, and electrically conductive particles,
the electrically conductive particles consist of non-oxide ceramic particles and at least one kind selected from the group consisting of iron alloy particles and stainless steel particles,
a mass ratio between the non-oxide ceramic particles and the at least one kind selected from the group consisting of the iron alloy particles and the stainless steel particles (the non-oxide ceramic particles/the at least one kind selected from the group consisting of the iron alloy particles and the stainless steel particles) is 1/9 to 8/2,
an amount of the electrically conductive particles contained is 5 to 30 mass % relative to the coating film,
the oxide particles include non-doped oxide particles and/or doped oxide particles,
the non-doped oxide particles include at least one kind selected from the group consisting of zinc oxide particles, tin oxide particles, magnesium oxide particles, calcium oxide particles, and strontium oxide particles,
the doped oxide particles include at least one kind selected from the group consisting of doped zinc oxide particles and doped tin oxide particles,
an amount of the oxide particles contained is 1 to 30 mass % relative to the coating film in a case where the oxide particles include the doped oxide particles, and is 1 to 10 mass % relative to the coating film in a case where the oxide particles do not include the doped oxide particles,
an amount of the coating film attached to the major surface is 2 to 20 g/m$^2$, and
an average particle diameter of the oxide particles is 0.2 to 5 μm;
a chemical conversion treatment covering film located on the coating film of the molded material; and a coating treatment film located on the chemical conversion treatment covering film.

2. The coated member according to claim 1, wherein the binder resin is a water-soluble or water-dispersible water-based resin.

3. The coated member according to claim 1, wherein the coating film further contains anti-corrosion particles.

4. The coated member according to claim 3, wherein the anti-corrosion particles contain at least one selected from the group consisting of:
   aluminum tripolyphosphate;
   Zn, Mg, Al, Ti, Zr, and Ce salts of phosphoric acid and phosphorous acid;
   a hydrocalumite-treated phosphoric acid compound;
   Ca ion exchange silica, and
   amorphous silica with an oil absorption of 100 to 1000 ml/100 g, a specific surface area of 200 to 1000 $m^2/g$, and an average particle diameter of 2.0 to 30 μm.

5. The coated member according to claim 4, wherein the oxide particles include the doped oxide particles, and the aluminum tripolyphosphate is aluminum tripolyphosphate containing Mg.

6. The coated member according to claim 1, wherein the metal sheet is a zinc-based plated steel sheet or an aluminum-based plated steel sheet.

7. The coated member according to claim 1, wherein the mass ratio between the non-oxide ceramic particles and the at least one kind selected from the group consisting of the iron alloy particles and the stainless steel particles (the non-oxide ceramic particles/the at least one kind selected from the group consisting of the iron alloy particles and the stainless steel particles) is 1/9 to 7/3.

8. The coated member according to claim 1, wherein the mass ratio between the non-oxide ceramic particles and the at least one kind selected from the group consisting of the iron alloy particles and the stainless steel particles (the non-oxide ceramic particles/the at least one kind selected from the group consisting of the iron alloy particles and the stainless steel particles) is 1/9 to 6/4.

9. The coated member according to claim 1, wherein the mass ratio between the non-oxide ceramic particles and the at least one kind selected from the group consisting of the iron alloy particles and the stainless steel particles (the non-oxide ceramic particles/the at least one kind selected from the group consisting of the iron alloy particles and the stainless steel particles) is 1/9 to 5/5.

10. A method for producing the coated member according to claim 1, comprising:
    a step of performing chemical conversion treatment on the molded material obtained by molding the surface-treated metal sheet and forming a chemical conversion treatment covering film on the coating film; and
    a step of forming a coating treatment film on the chemical conversion treatment covering film.

* * * * *